US011290635B2

United States Patent
Tanaka et al.

(10) Patent No.: US 11,290,635 B2
(45) Date of Patent: *Mar. 29, 2022

(54) IMAGING APPARATUS AND IMAGE PROCESSING METHOD

(71) Applicant: FUJIFILM Corporation, Tokyo (JP)

(72) Inventors: Koichi Tanaka, Saitama (JP); Seiji Tanaka, Saitama (JP); Makoto Kobayashi, Saitama (JP); Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,191

(22) Filed: Feb. 3, 2021

(65) Prior Publication Data

US 2021/0160430 A1     May 27, 2021

Related U.S. Application Data

(63) Continuation of application No. 16/562,631, filed on Sep. 6, 2019, now Pat. No. 10,958,824, which is a
(Continued)

(30) Foreign Application Priority Data

Mar. 30, 2017 (JP) .............................. JP2017-068559

(51) Int. Cl.
  *H04N 5/232*    (2006.01)
  *H04N 9/04*     (2006.01)
(52) U.S. Cl.
  CPC ..... *H04N 5/232122* (2018.08); *H04N 9/0451* (2018.08); *H04N 9/0455* (2018.08)
(58) Field of Classification Search
  CPC ........... H04N 5/232122; H04N 9/0451; H04N 9/0455
  See application file for complete search history.

(56) References Cited

U.S. PATENT DOCUMENTS 9,503,661 B2 * 11/2016 Okazawa ................. H04N 9/07
10,412,294 B2 *  9/2019 Murata .............. H04N 5/36961
(Continued)

FOREIGN PATENT DOCUMENTS

JP    2015-70432 A    4/2015
JP    2016-28265 A    2/2016
(Continued)

OTHER PUBLICATIONS

International Preliminary Report on Patentability and Written Opinion of the International Application No. PCT/JP2018/012109, dated Oct. 10, 2019, with English translation of the Written Opinion.
(Continued)

*Primary Examiner* — Ahmed A Berhan
(74) *Attorney, Agent, or Firm* — Birch, Stewart, Kolasch & Birch, LLP

(57) ABSTRACT

An imaging apparatus and an image processing method capable of increasing correction accuracy of a phase difference detection pixel even in a case where the phase difference detection pixel is densely arranged in an imaging element in order to secure AF performance are provided. An imaging element includes normal pixels of RGB and first and second phase difference pixels of which opening portions are adjacently arranged to face each other in a horizontal direction and in which a G filter is arranged. A pixel value addition unit (64) generates an addition pixel corresponding to a virtual G pixel at a pixel position between the first and second phase difference pixels by adding pixel values of the pair of the first and second phase difference pixels. In a case where the first or second phase difference pixel is set as an in-focus pixel that is an interpolation target, an average value interpolation unit (62) uses the normal pixels surrounding a pixel position of the in-focus pixel and the addition pixel in a case of performing an interpolation
(Continued)

operation on a pixel value at the pixel position of the in-focus pixel.

17 Claims, 18 Drawing Sheets

Related U.S. Application Data continuation of application No. PCT/JP2018/012109, filed on Mar. 26, 2018.

(56) References Cited

U.S. PATENT DOCUMENTS

| | | |
|---|---|---|
| 2015/0365639 A1 | 12/2015 | Ogawa |
| 2016/0212364 A1 | 7/2016 | Okazawa et al. |

FOREIGN PATENT DOCUMENTS

| | | |
|---|---|---|
| JP | 2016-45245 A | 4/2016 |
| JP | 2016-208042 A | 12/2016 |

OTHER PUBLICATIONS

International Search Report for International Application No. PCT/JP2018/012109, dated Jun. 5, 2018, with English translation.
Notice of Allowance dated Nov. 9, 2020 in copending U.S. Appl. No. 16/562,631.
Office Action dated Aug. 3, 2020 in copending U.S. Appl. No. 16/562,631.

* cited by examiner

FIG. 4

FIG. 6
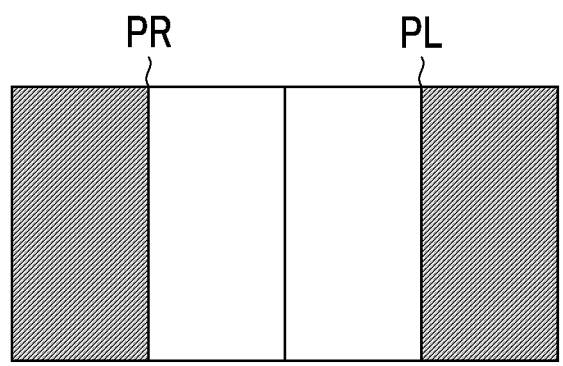
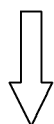
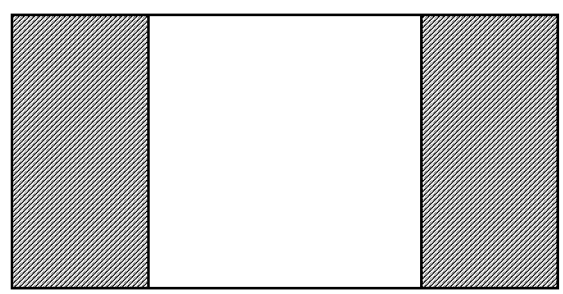

IMAGING APPARATUS AND IMAGE PROCESSING METHOD

CROSS-REFERENCE TO RELATED APPLICATIONS

The present application is a Continuation of U.S. patent application Ser. No. 16/562,631, filed Sep. 6, 2019, which is Continuation of PCT International Application No. PCT/JP2018/012109 filed on Mar. 26, 2018 claiming priority under 35 U.S.C § 119(a) to Japanese Patent Application No. 2017-068559 filed on Mar. 30, 2017. Each of the above applications is hereby expressly incorporated by reference, in its entirety, into the present application.

BACKGROUND OF THE INVENTION

1. Field of the Invention

The present invention relates to an imaging apparatus and an image processing method and particularly, to an imaging apparatus comprising an imaging element including a phase difference detection pixel and an image processing method.

2. Description of the Related Art

Recently, a technology for arranging a pair of phase difference pixels having opening portions for pupil separation at different positions as a phase difference detection pixel in an imaging element and performing phase difference AF based on a phase difference between two image signals obtained from the pair of phase difference pixels has been widely used in order to increase the speed of autofocus (AF) (JP2016-208042A and JP2015-070432A).

The phase difference pixel is formed by covering a part of an opening of a normal pixel with a light shielding film. For example, in the case of desiring to detect the phase difference in a left-right (horizontal) direction on the surface of the imaging element (image sensor), a pixel (first phase difference pixel) obtained by shielding a left side of the normal pixel from light and a pixel (second phase difference pixel) obtained by shielding a right side of the normal pixel from light are formed. Phase difference detection is performed using pixel values obtained from the first phase difference pixel and the second phase difference pixel. The phase difference pixel has a narrow opening and has directivity unlike the normal pixel. Thus, the phase difference pixel strongly depends on an incidence ray angle with respect to the image sensor. The pixel value of the phase difference pixel varies depending on an image height, an F-number, a defocus amount, and the like. In the detection of the phase difference, it is necessary to arrange such a pixel at a constant interval on an image surface. Since the normal pixel and the phase difference pixel have different pixel characteristics, it is necessary to generate a recording image or a display image after appropriately correcting the phase difference pixel.

An imaging element disclosed in JP2016-208042A includes a first pixel array in which a plurality of G pixels detecting light of green (G) are arranged at a predetermined pitch in the horizontal direction (X direction), and a second pixel array in which a plurality of B pixels detecting light of blue (B) and R pixels detecting light of red (R) are alternately arranged at the predetermined pitch in the horizontal direction (Y direction). A plurality of first pixel arrays and second pixel arrays are alternately arranged at the predetermined pitch in the Y direction. In addition, the first pixel array and the second pixel array are arranged to deviate from each other by half of the predetermined pitch in the Y direction. Furthermore, each side of each unit pixel of the imaging element is arranged to be inclined at 45 degrees with respect to the X direction and the Y direction (FIG. 5 and Paragraph 0020 in JP2016-208042A).

SUMMARY OF THE INVENTION

In the imaging element disclosed in JP2016-208042A, the G pixel (virtual G pixel) can be generated at a position between the pair of phase difference pixels by adding the pixel values of the pair of phase difference pixels to calculate the double of the pixel value. However, it is also necessary to add the pixel values of two adjacent pixels of the same color for the normal pixel (the G pixel, the R pixel, and the B pixel in which the phase difference pixel is not assigned) other than the phase difference pixel. A problem arises in that the resolutions of the recording image and the display image is decreased by half.

In addition, the imaging element disclosed in JP2016-208042A has a special arrangement such that the horizontal centroid of the added phase difference pixels deviates from the horizontal centroid of the added normal pixels. In addition, a color arrangement of virtual R pixels, G pixels, and B pixels formed after the addition corresponds to the Bayer arrangement which is a square arrangement. Thus, the imaging element is a special imaging element in which each side of each unit pixel of the imaging element is arranged to be inclined at 45 degrees with respect to the X direction and the Y direction.

JP2015-070432A discloses average value interpolation in which pixel values of a plurality of surrounding normal pixels are used in interpolation of the pixel value of the phase difference pixel. However, the idea of adding the pixel values of the pair of phase difference pixels is not disclosed. In a case where the pixel values of the pair of phase difference pixels are added (used in the average value interpolation), the accuracy of the average value interpolation is decreased because the pair of phase difference pixels disposed in an imaging element disclosed in JP2015-070432A is not adjacent to each other.

The present invention is conceived in view of such matters. An object of the present invention is to provide an imaging apparatus and an image processing method capable of increasing correction accuracy of a phase difference detection pixel even in a case where the phase difference detection pixel is densely arranged in an imaging element in order to secure AF performance.

In order to achieve the above object, an imaging apparatus according to one aspect of the present invention comprises an imaging element in which a plurality of phase difference detection pixels and a plurality of normal pixels are two-dimensionally arranged in a first direction and a second direction orthogonal to the first direction, the phase difference detection pixel includes a first phase difference pixel and a second phase difference pixel including opening portions for pupil separation at different positions in the first direction, and the opening portions of the first phase difference pixel and the second phase difference pixel are adjacently arranged to face each other, in the plurality of normal pixels, a first filter corresponding to a first color most contributing to obtaining a brightness signal and a plurality of second filters respectively corresponding to two or more colors other than the first color are arranged in a first periodic color arrangement, and in each of the first phase difference pixel and the second phase difference pixel, the first filter is arranged, or light in a wavelength range wider than a transmission wavelength range of the first filter is incident; a pixel value addition unit that generates an addition pixel value at a pixel position between the first phase difference pixel and the second phase difference pixel by adding pixel values of the first phase difference pixel and the second phase difference pixel of which the opening portions are adjacently arranged to face each other; and a first interpolation unit that sets the first phase difference pixel or the second phase difference pixel as an in-focus pixel and generates a pixel value at a pixel position of the in-focus pixel by using pixel values of pixels surrounding the pixel position of the in-focus pixel, the addition pixel value added by the pixel value addition unit being used as a pixel value of one pixel of the surrounding pixels.

In a case where the pixel values of the pair of the first phase difference pixel and the second phase difference pixel of which the opening portions are adjacently arranged to face each other are added, a virtual pixel (pixel including the first filter) can be created between the pair of the first phase difference pixel and the second phase difference pixel.

According to one aspect of the present invention, a pixel value (addition pixel value) of the virtually created pixel is used in the case of interpolating a pixel value for imaging at the pixel position of the first phase difference pixel or the second phase difference pixel (in-focus pixel) which is a correction target. Thus, interpolation accuracy of the phase difference detection pixel (in-focus pixel) can be increased. Accordingly, even in a case where the phase difference detection pixel is densely arranged in the imaging element in order to secure AF performance, the interpolation accuracy decreased by the dense arrangement can be complemented using the addition pixel value.

It is preferable that the imaging apparatus according to another aspect of the present invention further comprises an addition pixel level correction unit that corrects the addition pixel value by multiplying the addition pixel value added by the pixel value addition unit by a set level adjustment coefficient, and the first interpolation unit uses the addition pixel value corrected by the addition pixel level correction unit.

According to another aspect of the present invention, the addition pixel value is corrected by multiplying the addition pixel value obtained by adding the pixel values of the pair of the first phase difference pixel and the second phase difference pixel by the level adjustment coefficient. Thus, the addition pixel value after correction can be set to completely match a pixel value of the normal pixel which includes the first filter and of which the pixel value may be obtained in a case where the normal pixel is present at the same pixel position.

In the imaging apparatus according to still another aspect of the present invention, it is preferable that the first interpolation unit uses at least one pixel value of the addition pixel value or a pixel value of the normal pixel in which the first filter is arranged. That is, the first interpolation unit may use only the addition pixel value in the interpolation, use both of the addition pixel value and the pixel value of the normal pixel in the interpolation, or use only the pixel value of the normal pixel in the interpolation. The pixel value to be used in the interpolation can be appropriately decided depending on an aspect, a scene, and the like of the interpolation.

It is preferable that the imaging apparatus according to still another aspect of the present invention further comprises a signal gradient calculation unit that calculates signal gradients of the pixels surrounding the pixel position of the in-focus pixel, and the first interpolation unit performs an interpolation operation on the pixel value at the pixel position of the in-focus pixel using a pixel value of a pixel selected based on the calculated signal gradients out of the surrounding pixels.

According to still another aspect of the present invention, a pixel used for interpolating the in-focus pixel is selected based on the signal gradients of the pixels surrounding the pixel position of the in-focus pixel which is the correction target. Thus, the correction accuracy of the phase difference pixel can be increased. For example, erroneous interpolation can be prevented (interpolation accuracy can be improved) by detecting a plurality of pixels that have the same color as a color at the pixel position of the in-focus pixel and are present in a signal gradient direction in which the signal gradients of the surrounding pixels are minimized, and using pixel values of the plurality of detected pixels in the interpolation. Four directions including the first direction, the second direction, and a third direction and a fourth direction between the first direction and the second direction are considered as the signal gradient direction.

It is preferable that the imaging apparatus according to still another aspect of the present invention further comprises a saturation determination unit that determines saturation of at least one pixel of the in-focus pixel, the first phase difference pixel or the second phase difference pixel adjacent to the in-focus pixel, or the normal pixel which is adjacent to the in-focus pixel and in which the first filter is arranged, and in a case where the saturation determination unit determines that the pixel is saturated, the first interpolation unit uses only the pixel value of the normal pixel in which the first filter is arranged.

In a case where the normal pixel which is adjacent to the in-focus pixel and in which the first filter is arranged is saturated, the addition pixel is generally also saturated. In a case where the addition pixel value of the addition pixel is clipped based on a saturation level, the pixel values of the saturated normal pixels match, and a problem does not particularly arise. In a case where the value of the level adjustment coefficient for adjusting the addition pixel value cannot be correctly set, the addition pixel adjusted using the level adjustment coefficient may not be saturated. In this case, a level difference in signal is present between the adjusted addition pixel and the normal pixel. In such a case, the addition pixel should not be used in the interpolation.

In addition, even in a case where the normal pixel which is adjacent to the in-focus pixel and in which the first filter is arranged is not saturated, the in-focus pixel and the first phase difference pixel or the second phase difference pixel adjacent to the in-focus pixel may be saturated in a case where high frequency strong light is incident on these pixels. In this case, the addition pixel value is not reliable, and the addition pixel should not be used in the interpolation. The saturation of the pixel refers to a case of exceeding a preset saturation level and is not necessarily limited to a maximum value that can be output from the pixel of the imaging element.

It is preferable that the imaging apparatus according to still another aspect of the present invention further comprises a second interpolation unit that sets the first phase difference pixel or the second phase difference pixel as the in-focus pixel and generates the pixel value at the pixel position of the in-focus pixel by gain interpolation, the second interpolation unit generating the pixel value at the pixel position of the in-focus pixel by the gain interpolation based on the pixel value of the in-focus pixel and gain interpolation information set for the pixel position of the in-focus pixel.

Approximately half of the intensity of light incident on the surrounding normal pixel is incident on the first phase difference pixel and the second phase difference pixel. Thus, sensitivity is decreased below that of the normal pixel. The "gain interpolation" refers to interpolation in which a signal level is adjusted to that of the normal pixel by multiplying the pixel value of the phase difference detection pixel by predetermined gain interpolation information in order to supplement the decrease in sensitivity of the phase difference detection pixel. In the case of interpolating the phase difference detection pixel, depending on an imaging scene and the like, it may be more appropriate to perform the gain interpolation than "average value interpolation" that uses the surrounding pixel of the in-focus pixel. In that case, the "gain interpolation" is performed.

It is preferable that the imaging apparatus according to still another aspect of the present invention further comprises a final pixel value decision unit that decides a final pixel value at the pixel position of the in-focus pixel by selecting any one pixel value of two pixel values including the pixel value generated by the first interpolation unit at the pixel position of the in-focus pixel and the pixel value generated by the second interpolation unit at the pixel position of the in-focus pixel or generating a pixel value obtained by weighted addition of the two pixel values. Any one pixel value selected from the pixel value subjected to the "average interpolation" by the first interpolation unit and the pixel value subjected to the "gain interpolation" by the second interpolation unit or the pixel value obtained by the weighted addition of the two pixel values is set as the final pixel value at the pixel position of the in-focus pixel.

In the imaging apparatus according to still another aspect of the present invention, it is preferable that in a case where the pixel position of the in-focus pixel corresponds to a pixel position of the normal pixel in which the second filter is arranged, the first interpolation unit uses only the normal pixel in which the second filter is arranged. The reason is that since the addition pixel value obtained by adding the pixel values of the pair of the first phase difference pixel and the second phase difference pixel is the pixel value of the virtual pixel including the first filter, the addition pixel value cannot be used in the interpolation of the in-focus pixel corresponding to the second filter.

In the imaging apparatus according to still another aspect of the present invention, it is preferable that the first filter is a green filter allowing transmission in a wavelength range of green, and the plurality of second filters include a red filter allowing transmission in a wavelength range of red and a blue filter allowing transmission in a wavelength range of blue, the first periodic color arrangement arranged in the two-dimensionally arranged plurality of phase difference detection pixels and the plurality of normal pixels is configured by alternately arranging, in the first direction and the second direction, a first arrangement that corresponds to 3×3 pixels and in which the green filters are arranged at a center and four corners, the red filters are arranged in the first direction on both sides of the green filter at the center, and the blue filters are arranged in the second direction, and a second arrangement that corresponds to 3×3 pixels and in which the green filters are arranged at a center and four corners, the blue filters are arranged in the first direction on both sides of the green filter at the center, and the red filters are arranged in the second direction, and the imaging element includes a phase difference pixel row in which the first phase difference pixel and the second phase difference pixel are arranged at positions adjacent to the green filter in the first direction, and a normal pixel row in which only the normal pixel is arranged in the first direction.

The imaging element having the first periodic color arrangement of the above configuration includes 2×2 pixels in which pixels (G pixels) including the green filter are adjacently arranged. The first phase difference pixel and the second phase difference pixel can be arranged at the positions of two G pixels adjacent in the first direction in the 2×2 pixels. Even in a case where the two G pixels of the 2×2 pixels are assigned to the first phase difference pixel and the second phase difference pixel, G pixels (normal pixels) are present around the first phase difference pixel and the second phase difference pixel. Thus, the average value interpolation can be performed with high interpolation accuracy.

In the imaging apparatus according to still another aspect of the present invention, it is preferable that the first periodic color arrangement arranged in the plurality of normal pixels is a Bayer arrangement, the imaging element includes a phase difference pixel row in which the first phase difference pixel, the second phase difference pixel, and the normal pixel are arranged in the first direction, and a normal pixel row in which only the normal pixel is arranged in the first direction, and in the phase difference pixel row, three pixels including the first and second phase difference pixels and one normal pixel as one cycle are periodically arranged, and a green filter allowing transmission in a wavelength range of green is arranged in the first phase difference pixel and the second phase difference pixel.

In the imaging element having the Bayer arrangement, by disposing the phase difference pixel row in which three pixels including the first and second phase difference pixels and one normal pixel as one cycle are periodically arranged, the normal pixel including the green filter (G pixel) and the normal pixel including the blue filter (B pixel) are included in the phase difference pixel row in a case where the phase difference pixel row is formed in a row (GB row) of the Bayer arrangement in which the green filter and the blue filter are alternately arranged. Thus, the average value interpolation can be accurately performed.

In addition, in the imaging element having the Bayer arrangement, the G pixels corresponding to the first color most contributing to obtaining a brightness signal are arranged more than (as twice as) the B pixels or the normal pixels including the red filter (R pixels). Thus, the imaging element having the Bayer arrangement is the most general imaging element capable of improving resolution, improving reproduction of a high brightness component, and reducing jaggedness. By arranging the green filter in the first phase difference pixel and the second phase difference pixel, the average value interpolation of the in-focus pixel can be accurately performed using the pixel values of the surrounding G pixels (the number of G pixel is large) and/or the addition pixel value in a case where the in-focus pixel is at a position corresponding to the G pixel.

It is preferable that the imaging apparatus according to still another aspect of the present invention further comprises an imaging optical system that forms a subject image on a light-receiving surface of the imaging element, a phase difference detection unit that detects a phase difference between a first pixel value obtained from the first phase difference pixel of the imaging element and a second pixel value obtained from the second phase difference pixel, and an autofocus control unit that controls the imaging optical system based on the phase difference detected by the phase difference detection unit.

Since the opening portions of the pair of the first phase difference pixel and the second phase difference pixel are adjacently arranged to face each other, an interval between the pair of the first phase difference pixel and the second phase difference pixel is minimized. Accordingly, a spatial sampling frequency of a phase difference can be maximized, and phase difference AF for a subject having a high spatial frequency can be performed more favorably (with higher accuracy) than that in a case where the pair of the first phase difference pixel and the second phase difference pixel is separately arranged with the normal pixel interposed therebetween.

Still another aspect of the invention is an image processing method for an imaging apparatus comprising an imaging element in which a plurality of phase difference detection pixels and a plurality of normal pixels are two-dimensionally arranged in a first direction and a second direction orthogonal to the first direction, the phase difference detection pixel includes a first phase difference pixel and a second phase difference pixel including opening portions for pupil separation at different positions in the first direction, and the opening portions of the first phase difference pixel and the second phase difference pixel are adjacently arranged to face each other, in the plurality of normal pixels, a first filter corresponding to a first color most contributing to obtaining a brightness signal and a plurality of second filters respectively corresponding to two or more colors other than the first color are arranged in a first periodic color arrangement, and in each of the first phase difference pixel and the second phase difference pixel, the first filter is arranged, or light in a wavelength range wider than a transmission wavelength range of the first filter is incident. The method comprises a step of generating an addition pixel value at a pixel position between the first phase difference pixel and the second phase difference pixel by adding pixel values of the first phase difference pixel and the second phase difference pixel of which the opening portions are adjacently arranged to face each other, a step of selecting the first phase difference pixel or the second phase difference pixel that is not processed as an in-focus pixel, and an interpolation step of generating a pixel value at a pixel position of the selected in-focus pixel by using pixel values of pixels surrounding the pixel position of the in-focus pixel, the addition pixel value being used as a pixel value of one pixel of the surrounding pixels.

It is preferable that the image processing method according to still another aspect of the present invention further comprises a step of correcting the addition pixel value by multiplying the addition pixel value by a set level adjustment coefficient, and in the interpolation step, the addition pixel value corrected using the level adjustment coefficient is used.

In the image processing method according to still another aspect of the present invention, it is preferable that in the interpolation step, at least one pixel value of the addition pixel value or a pixel value of the normal pixel in which the first filter is arranged is used.

It is preferable that the image processing method according to still another aspect of the present invention further comprises a step of correcting the addition pixel value by multiplying the addition pixel value by a set level adjustment coefficient, and in the interpolation step, an interpolation operation is performed on the pixel value at the pixel position of the in-focus pixel using a pixel value of a pixel selected based on the calculated signal gradients out of the surrounding pixels.

According to the present invention, in the case of interpolating the pixel value for imaging at the pixel position of the first phase difference pixel or the second phase difference pixel (in-focus pixel), which is the correction target, using the pixel values of the pixels surrounding the in-focus pixel, the virtual pixel is created between the pair of the first phase difference pixel and the second phase difference pixel by adding the pixel values of the pair of the first phase difference pixel and the second phase difference pixel of which the opening portions are adjacently arranged to face each other. The pixel value (addition pixel value) of the virtually created pixel is used in the interpolation. Thus, the correction accuracy of the in-focus pixel can be increased. Accordingly, even in a case where the phase difference detection pixel is densely arranged in the imaging element in order to secure AF performance, the interpolation accuracy decreased by the dense arrangement can be complemented using the addition pixel value.

BRIEF DESCRIPTION OF THE DRAWINGS

FIG. 4 is a diagram illustrating a first embodiment of color filter arrangement and arrangement of phase difference detection pixels in an imaging element.

FIG. 6 is a plan view schematically illustrating a pair of a first phase difference pixel PR and a second phase difference pixel PL.

FIG. 17 is a diagram illustrating a second embodiment of the color filter arrangement and the arrangement of phase difference detection pixels in the imaging element.

FIG. 18 is a diagram for describing the average value interpolation for the phase difference detection pixels in the imaging element of the second embodiment.

DESCRIPTION OF THE PREFERRED EMBODIMENTS

Hereinafter, an imaging apparatus and an image processing method according to preferred embodiments of the present invention will be described in accordance with the appended drawings.

[Imaging Apparatus]

Figure 1:
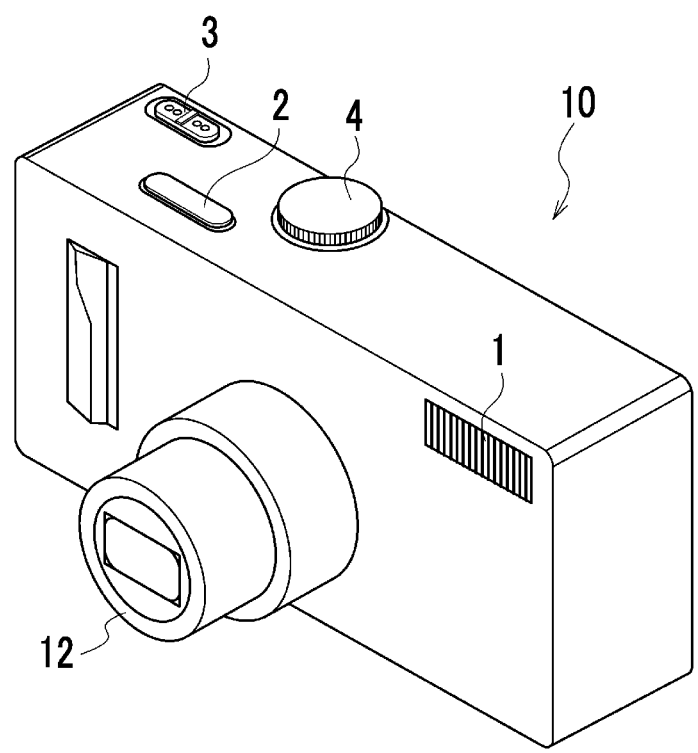
FIG. 1 is a perspective view illustrating one example of an imaging apparatus.
Figure 2:
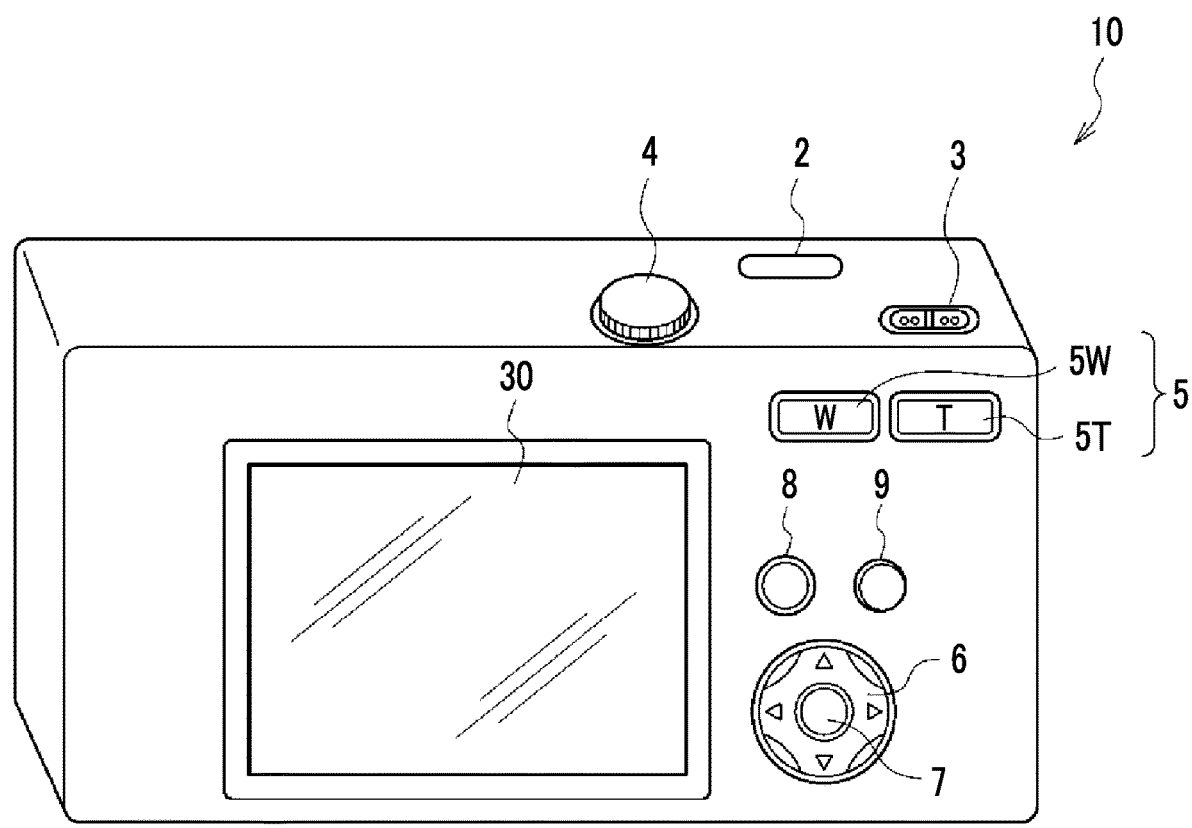
FIG. 2 is a rear view of the imaging apparatus illustrated in FIG. 1.

FIG. 1 and FIG. 2 are respectively a perspective view and a rear view illustrating the exterior of the imaging apparatus according to the embodiment of the present invention. An imaging apparatus 10 is a digital camera that receives light passing through a lens by an imaging element, converts the light into a digital signal, and records the digital signal in a recording medium as image data of a still picture or a motion picture.

As illustrated in FIG. 1, in the imaging apparatus 10, an imaging lens 12, a strobe 1, and the like are arranged on a front surface, and a shutter button 2, a power supply/mode switch 3, a mode dial 4, and the like are arranged on an upper surface. As illustrated in FIG. 2, a liquid crystal monitor 30, a zoom button 5, a cross button 6, a MENU/OK button 7, a playback button 8, a BACK button 9, and the like are arranged on the rear surface of the camera.

The imaging lens 12 is composed of a retractable zoom lens and is withdrawn from the main body of the camera by setting an operation mode of the camera to an imaging mode by the power supply/mode switch 3. The strobe 1 radiates strobe light to a main subject.

The shutter button 2 is configured with a so-called stroke type switch of two stages including "half push" and "full push" and functions as an imaging preparation instruction unit and also functions as an image recording instruction unit.

In a case where a still picture imaging mode is selected as the imaging mode and the shutter button 2 is subjected to the "half push", the imaging apparatus 10 performs an imaging preparation operation of performing autofocus (AF)/auto exposure (AE) control. In a case where the shutter button 2 is subjected to the "full push", the imaging apparatus 10 images and records a still picture.

In addition, in a case where a motion picture imaging mode is selected as the imaging mode and the shutter button 2 is subjected to the "full push", the imaging apparatus 10 starts recording a motion picture. In a case where the shutter button 2 is subjected to the "full push" again, the imaging apparatus 10 stops recording and enters a standby state.

The power supply/mode switch 3 has a function as a power supply switch for setting a power supply of the imaging apparatus 10 to be ON/OFF and a function as a mode switch for setting the mode of the imaging apparatus 10. The power supply/mode switch 3 is arranged to be slidable among an "OFF position", a "playback position", and an "imaging position". The power supply of the imaging apparatus 10 is switched ON by sliding the power supply/mode switch 3 to the "playback position" or the "imaging position". The power supply of the imaging apparatus 10 is switched OFF by sliding the power supply/mode switch 3 to the "OFF position". Sliding the power supply/mode switch 3 to the "playback position" sets a "playback mode", and sliding the power supply/mode switch 3 to the "imaging position" sets the "imaging mode".

The mode dial 4 functions as a mode switching unit that sets the imaging mode of the imaging apparatus 10. The imaging mode of the imaging apparatus 10 is set to various modes depending on a setting position of the mode dial 4. For example, the "still picture imaging mode" for performing still picture imaging and the "video imaging mode" for performing motion picture imaging are present.

The liquid crystal monitor 30 displays a live view image at the time of the imaging mode, displays a still picture or a motion picture at the time of the playback mode, and functions as a part of a graphical user interface by displaying a menu screen and the like.

The zoom button 5 functions as zoom instruction means for providing an instruction to zoom and includes a tele button 5T providing an instruction to zoom to a telephoto side and a wide button 5W providing an instruction to zoom to a wide angle side. In the imaging apparatus 10, operating the tele button 5T and the wide button 5W at the time of the imaging mode changes the focal length of the imaging lens 12. In addition, operating the tele button 5T and the wide button 5W at the time of the playback mode enlarges and shrinks the image in playback.

The cross button 6 is an operation unit that inputs instructions in four directions of upward, downward, leftward, and rightward directions and functions as a button (cursor movement operation means) for selecting an item from the menu screen or providing an instruction to select various setting items from each menu. A left/right key functions as a button (forward direction/backward direction forwarding) for frame forwarding at the time of the playback mode.

The MENU/OK button 7 is an operation button having functions of both a menu button for providing an instruction to display the menu on the screen of the liquid crystal monitor 30 and an OK button for providing an instruction to confirm and execute the content of selection and the like.

The playback button 8 is a button for switching to the playback mode in which the imaged and recorded still picture or motion picture is displayed on the liquid crystal monitor 30.

The BACK button 9 functions as a button for providing an instruction to cancel an input operation and return to the immediately previous operation state.

In the imaging apparatus 10 according to the present embodiment, the functions of the buttons/switches may be implemented by disposing and operating a touch panel without disposing members specific to the buttons/switches.

[Internal Configuration of Imaging Apparatus]

Figure 3:
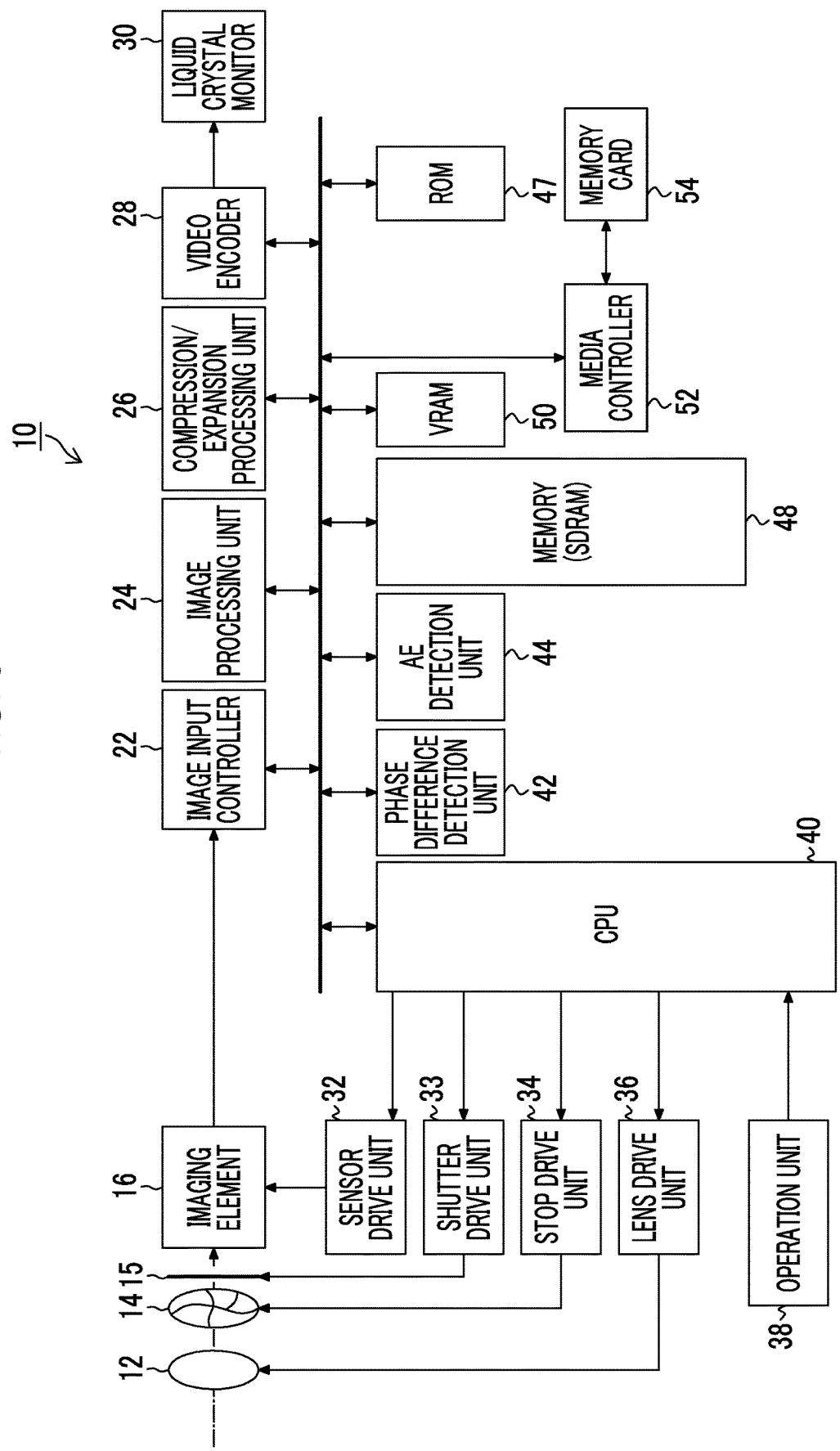
FIG. 3 is a block diagram illustrating one example of an internal configuration of the imaging apparatus illustrated in FIG. 1.

FIG. 3 is a block diagram illustrating an embodiment of an internal configuration of the imaging apparatus 10. The imaging apparatus 10 records the captured image in a memory card 54. The operation of the whole apparatus is managed and controlled by a central processing unit (CPU) 40.

An operation unit 38 such as the shutter button 2, the power supply/mode switch 3, the mode dial 4, the tele button 5T, the wide button 5W, the cross button 6, the MENU/OK button 7, the playback button 8, and the BACK button 9 is disposed in the imaging apparatus 10. A signal from the operation unit 38 is input into the CPU 40. The CPU 40 controls each circuit of the imaging apparatus 10 based on the input signal. For example, the CPU 40 performs drive control of the imaging element, lens drive control, stop drive control, imaging operation control, image processing control, recording/playback control of the image data, and display control of the liquid crystal monitor 30.

In a case where the power supply of the imaging apparatus 10 is switched ON by the power supply/mode switch 3, power is supplied to each block from a power supply unit, not illustrated, and the imaging apparatus 10 starts to be driven.

An image of a luminous flux passing through the imaging lens 12, a stop 14, a mechanical shutter 15, and the like is formed in an imaging element 16 that is a complementary metal-oxide semiconductor (CMOS) type color image sensor. The imaging element 16 is not limited to a CMOS type and may be a color image sensor of an XY address type or a charge coupled device (CCD) type.

In the imaging element 16, multiple light-receiving elements (photodiodes) are two-dimensionally arranged. A subject image formed on a light-receiving surface of each photodiode is converted into a signal voltage (or charge) of an amount corresponding to the intensity of an incidence ray. The signal voltage is converted into a digital signal through an analog/digital (A/D) converter in the imaging element 16 and is output.

<First Embodiment of Imaging Element>

In the imaging element 16, color filters of red (R), green (G), and blue (B) are arranged in a first periodic color arrangement, illustrated below, on a plurality of pixels configured with photoelectric conversion elements (photodiodes) that are two-dimensionally arranged in a first direction (horizontal direction) and a second direction (vertical direction) orthogonal to the first direction.

In addition, in the imaging element 16, a plurality of phase difference detection pixels and a plurality of normal pixels (pixels other than the phase difference detection pixel) for imaging are arranged.

Figure 4:
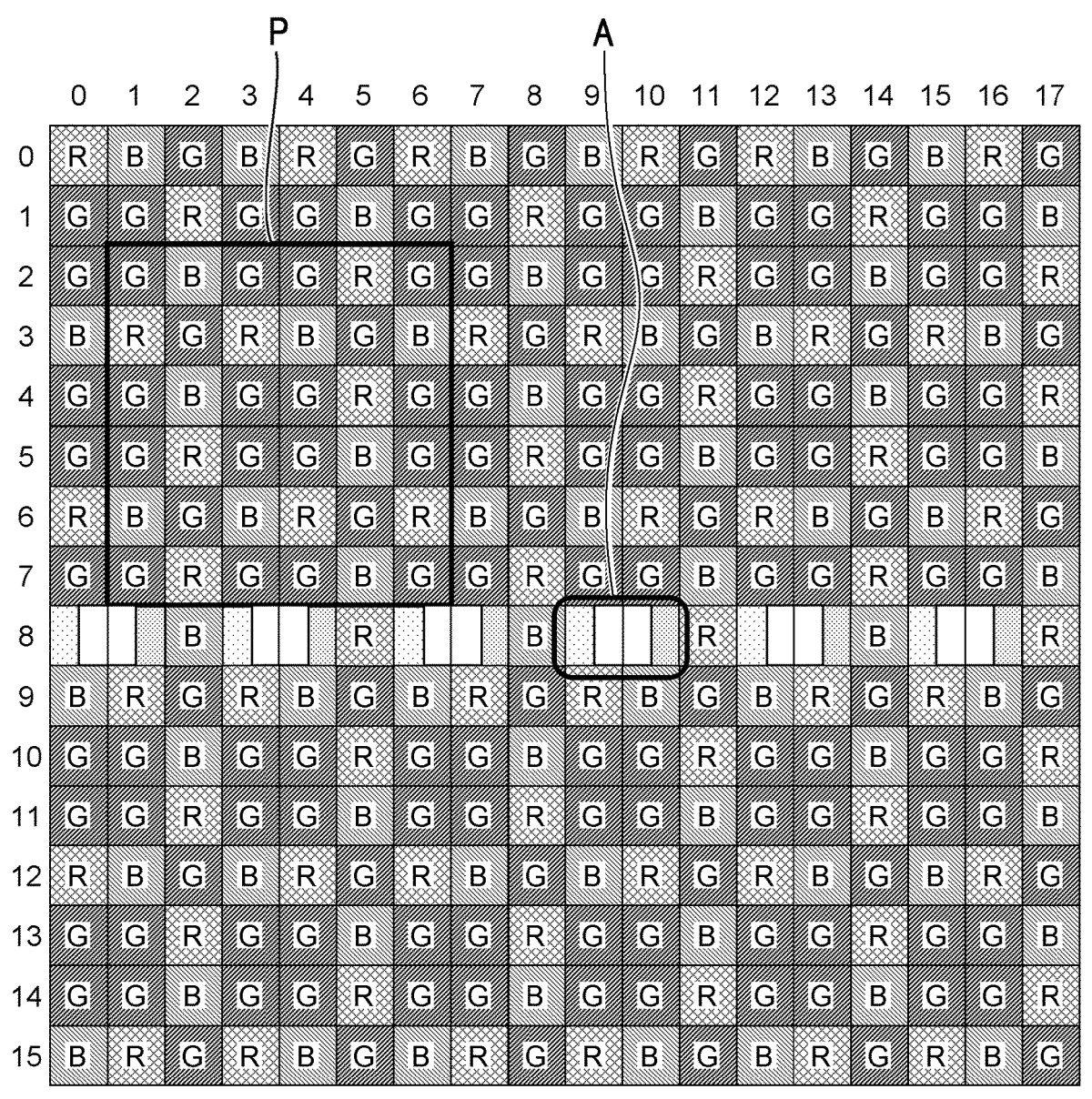

FIG. 4 is a diagram illustrating a first embodiment of color filter arrangement and arrangement of the phase difference detection pixels in the imaging element 16.

As illustrated in FIG. 4, a first filter corresponding to a first color (green) and any of a plurality of second filters respectively corresponding to two or more colors (red and blue) other than green are arranged in a first periodic color arrangement in the plurality of normal pixels of the imaging element 16.

The first periodic color arrangement of the color filters of the imaging element 16 of the first embodiment is the X-Trans (registered trademark) arrangement.

In the X-Trans arrangement, the red filter (R filter) allowing transmission in a wavelength range of red (R), the blue filter (B filter) allowing transmission in a wavelength range of blue (B), and the green filter (G filter) allowing transmission in a wavelength range of green (G) are arranged with predetermined periodicity. The G filter corresponds to a first filter that corresponds to a first color most contributing to obtaining a brightness signal compared to a second color (in this embodiment, colors of R and B). The R filter and the B filter correspond to a plurality of second filters that respectively correspond to two or more colors other than the first color.

The X-Trans arrangement includes a basic arrangement pattern P (pattern illustrated by a thick frame) including a square arrangement pattern corresponding to 6×6 pixels. The basic arrangement pattern P is repeatedly arranged in the horizontal direction and the vertical direction.

Figure 5:
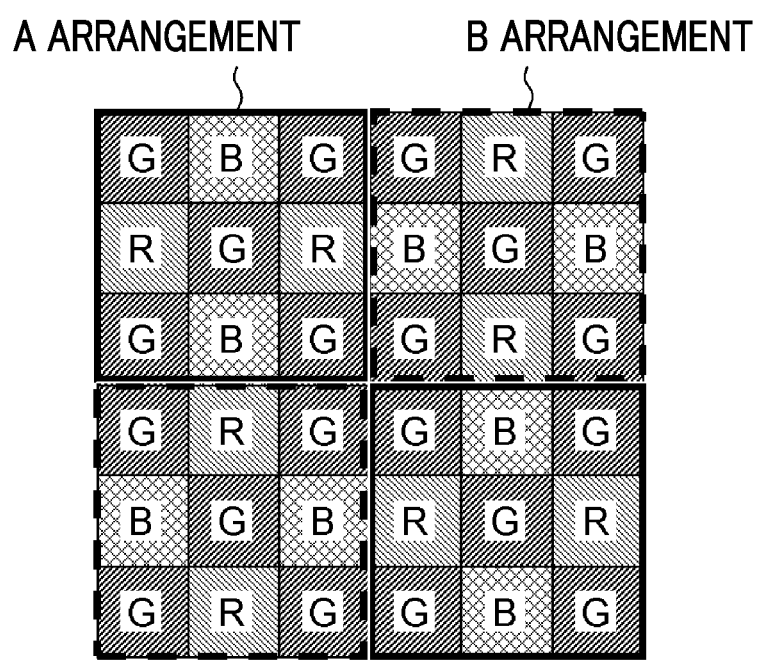
FIG. 5 is a diagram in which a basic arrangement pattern P illustrated in FIG. 4 is divided into four 3×3 pixels.

FIG. 5 illustrates a state where the basic arrangement pattern P illustrated in FIG. 4 is divided into four 3×3 pixels.

As illustrated in FIG. 5, the basic arrangement pattern P is an arrangement in which an A arrangement (first arrangement) of 3×3 pixels surrounded by a solid line frame and a B arrangement (second arrangement) of 3×3 pixels surrounded by a broken line frame are alternately arranged in the horizontal direction and the vertical direction.

In the A arrangement, the G filters are arranged at the center and the four corners of 3×3 pixels. The R filters are arranged in the horizontal direction on both sides of the G filter. The B filters are arranged in the vertical direction.

In the B arrangement, the G filters are arranged at the center and the four corners of 3×3 pixels. The B filters are arranged in the horizontal direction on both sides of the G filter. The R filters are arranged in the vertical direction.

The basic arrangement pattern P includes the G filters of a square arrangement corresponding to 2×2 pixels. The G filters of the square arrangement corresponding to 2×2 pixels is are formed by arranging the G filters at the four corners and the center of 3×3 pixels in the A arrangement or the B arrangement and alternately arranging the 3×3 pixels in the horizontal direction and the vertical direction.

The imaging element 16 includes a phase difference pixel row in which the phase difference detection pixels are arranged, and a normal pixel row in which only the normal pixels are arranged. In the example illustrated in FIG. 4, the eighth row corresponds to the phase difference pixel row. While only one phase difference pixel row is illustrated in FIG. 4, the phase difference pixel row is disposed at a certain interval (on both sides of a plurality of normal pixel rows) on the whole surface of the sensor or a specific AF region.

In addition, the phase difference pixel row is disposed in a row in which two pixels including the G filters (G pixels) are continuous. The phase difference detection pixel is arranged at the position of the continuous G pixels.

FIG. 6 is a plan view schematically illustrating the phase difference detection pixel (phase difference detection pixel illustrated by a thick frame A in FIG. 4) in the phase difference pixel row (eighth row) illustrated in FIG. 4.

As illustrated in FIG. 6, the phase difference detection pixel has an opening portion for pupil separation and includes a first phase difference pixel PR and a second phase difference pixel PL having opening portions at different positions in the horizontal direction. The opening portions of a pair of the first phase difference pixel PR and the second phase difference pixel PL are adjacently arranged to face each other.

The first phase difference pixel PR is a right opening pixel having the opening portion in the right half of the pixel. The second phase difference pixel PL is a left opening pixel having the opening portion in the left half of the pixel.

Figure 7:
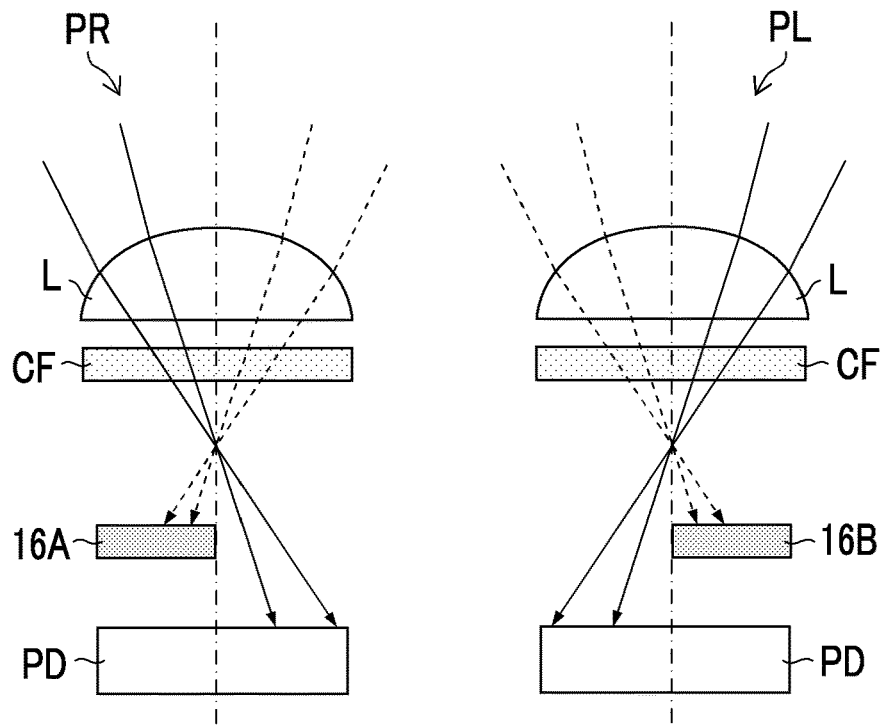
FIG. 7 is an enlarged main view illustrating configurations of the first phase difference pixel PR and the second phase difference pixel PL.

FIG. 7 is an enlarged main view illustrating configurations of the first phase difference pixel PR and the second phase difference pixel PL.

As illustrated in FIG. 7, a light shielding film 16A is arranged on the front surface side (microlens L side) of a photodiode PD of the first phase difference pixel PR, and a light shielding film 16B is arranged on the front surface side of the photodiode PD of the second phase difference pixel PL. The microlens L and the light shielding films 16A and 16B have a pupil separation function. In FIG. 6, the light shielding film 16A shields the left half of the light-receiving surface of the photodiode PD from light. Thus, the first phase difference pixel PR receives only a luminous flux passing on the left side of an optical axis among luminous fluxes passing through an exit pupil of the imaging lens 12. In addition, the G filter is arranged below the microlens L as a color filter CF.

The light shielding film 16B shields the right half of the light-receiving surface of the photodiode PD of the second phase difference pixel PL from light. Thus, the second phase difference pixel PL receives only a luminous flux passing on the right side of the optical axis among the luminous fluxes passing through the exit pupil of the imaging lens 12. By the microlens L and the light shielding films 16A and 16B having the pupil separation function, the luminous fluxes passing through the exit pupil on the left and right sides are separated and are respectively incident on the first phase difference pixel PR and the second phase difference pixel PL.

Figure 8:
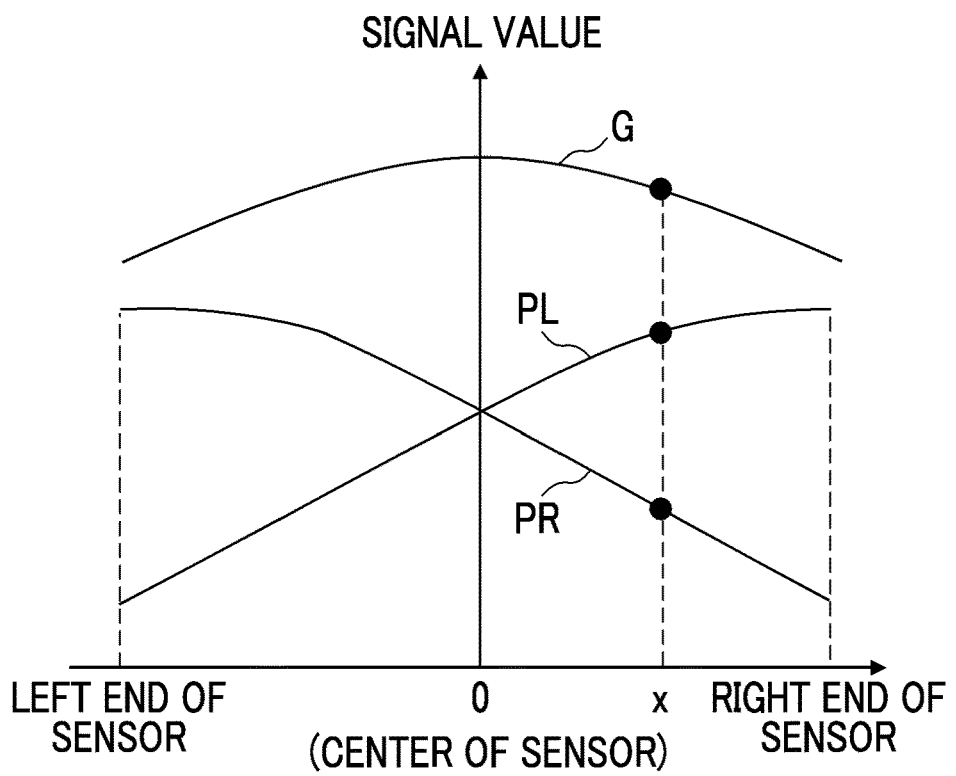
FIG. 8 is a graph illustrating sensitivities of a normal pixel (G pixel), the first phase difference pixel PR, and the second phase difference pixel PL in a left-right direction of the imaging element under a certain condition.

FIG. 8 is a graph illustrating sensitivities of the normal pixel (G pixel), the first phase difference pixel PR, and the second phase difference pixel PL in a left-right direction of the imaging element 16 under a certain condition.

As illustrated in FIG. 8, the sensitivity of the normal pixel (G pixel) of which the opening portion is not shielded from light has the highest sensitivity. The sensitivities of the first phase difference pixel PR and the second phase difference pixel PL are lower than the sensitivity of the G pixel. In addition, the left half of the opening of the first phase difference pixel PR and the right half of the opening of the second phase difference pixel PL are shielded from light by the light shielding films. Thus, the sensitivities (signal values) of the first phase difference pixel PR and the second phase difference pixel PL are left-right asymmetric with the center of the sensor (=image) as a reference.

The sensitivities (signal values) of the first phase difference pixel PR and the second phase difference pixel PL match at the center of the sensor. The sensitivity of the first phase difference pixel PR is increased (signal value is increased) in the direction of the left end side of the sensor. The sensitivity of the second phase difference pixel PL is increased (signal value is increased) in the direction of the right end side of the sensor.

In a case where a sensor position x is focused in FIG. 8, a relationship among the signal value (G) of the G pixel and the signal values (PR and PL) of the first phase difference pixel PR and the second phase difference pixel PL at the sensor position x satisfies G>PL>PR.

An addition pixel value (PA (=PL+PR)) obtained by adding the signal values (pixel values) of the pair of the first phase difference pixel PR and the second phase difference pixel PL almost matches the signal value (G) of the normal pixel (G pixel) disposed at the same position (PA G) regardless of the sensor position at which the pair of the first phase difference pixel PR and the second phase difference pixel PL is disposed.

That is, as illustrated in FIG. 6, in a case where the image signals (pixel values) of the pair of the first phase difference pixel PR and the second phase difference pixel PL are added, the added pixel value (addition pixel value) is almost equal to the pixel value of the normal pixel (G pixel). In addition, the added pixel (addition pixel) can be regarded as being present between the pair of the first phase difference pixel PR and the second phase difference pixel PL.

The pixel value (in the present example, corresponds to the pixel value of the G pixel of the normal pixel) of the addition pixel including the pair of the first phase difference pixel PR and the second phase difference pixel PL can be used in the case of performing an interpolation operation on the pixel value of the G pixel at the pixel position of the in-focus pixel of the first phase difference pixel PR or the second phase difference pixel PL using the average value interpolation. Details of the correction of the phase difference value will be described below.

Returning to FIG. 3, the image signal (image data) read from the imaging element 16 at the time of imaging the motion picture or the still picture is temporarily stored in a memory (synchronous dynamic random access memory (SDRAM)) 48 or is input into a phase difference detection unit 42, an AE detection unit 44, and the like through an image input controller 22.

The CPU 40 manages and controls each unit of the imaging apparatus 10 based on the operation in the operation unit 38 and performs an AF operation and an AE operation at all times during imaging (display) of the live view image and imaging (recording) of the motion picture.

The phase difference detection unit 42 is a part performing the phase difference AF process and detects the phase difference using the output signal of each of the first phase difference pixel PR and the second phase difference pixel PL obtained through the image input controller 22. Details of the detection of the phase difference by the phase difference detection unit 42 will be described below.

In a case where phase difference data indicating the phase difference is input from the phase difference detection unit 42, the CPU 40 functions as a focal point adjusting unit that performs the phase difference AF based on the phase difference data. That is, the CPU 40 calculates a deviation amount (defocus amount) between a focus position of the imaging lens 12 and an image forming surface of the imaging element 16 based on the phase difference data and moves a focus lens in the imaging lens 12 through a lens drive unit 36 such that the calculated defocus amount becomes zero. The calculation of the defocus amount may be performed by the phase difference detection unit 42.

The AE detection unit 44 calculates the integrating accumulation of the image data (for example, the pixel values of the G pixels of the whole screen) obtained through the image input controller 22 or calculates the integrating accumulation of the image data (pixel values of the G pixels) differently weighted between a center portion and a peripheral portion of the screen and outputs the integrating accumulation value to the CPU 40. The CPU 40 calculates the brightness (imaging exposure value (Ev value)) of the subject from the integrating accumulation value input from the AE detection unit 44. In a case where the imaging mode is the still picture imaging mode, the CPU 40 performs the above AF control again in a case where the shutter button 2 is subjected to a first stage push (half push). In a case where the shutter button 2 is subjected to the full push, the CPU 40 calculates the brightness (imaging Ev value) of the subject, decides the F-number of the stop 14 and a light exposure time (shutter speed) of the mechanical shutter 15 based on the calculated imaging Ev value, and images the still picture (exposure control).

In a case where the imaging mode is the motion picture imaging mode, the CPU 40 starts imaging and recording (picture recording) the motion picture in a case where the shutter button 2 is subjected to the full push. At the time of imaging the motion picture, the CPU 40 opens the mechanical shutter 15, consecutively reads (for example, 30 frames/second or 60 frames/second as a frame rate) the image data from the imaging element 16, consecutively performs the phase difference AF, calculates the brightness of the subject, and controls the shutter speed (a charge accumulation time by rolling shutter) by a shutter drive unit 33 and/or the stop 14 by a stop drive unit 34.

The CPU 40 operates the zoom lens to advance and retract in the optical axis direction through the lens drive unit 36 in response to the zoom instruction from the zoom button 5 and changes the focal length.

In addition, the ROM 47 is a read only memory (ROM) or an electrically erasable programmable read-only memory (EEPROM) storing defect information related to the imaging element 16 and various parameters and tables used in image processing and the like. In the present example, the ROM 47 stores information related to the phase difference pixel row (including the pixel positions of the first phase difference pixel PR and the second phase difference pixel PL) and the normal pixel row of the imaging elements 16 and gain interpolation information, a level adjusting coefficient, and the like described below.

The image processing unit 24 reads non-processed image data (RAW data) temporarily stored in the memory 48 through the image input controller 22 at the time of imaging the motion picture or the still picture. The image processing unit 24 performs an offset process, a pixel interpolation process (interpolation process for the phase difference detection pixel, a defective pixel, and the like), white balance correction, a gain control process including sensitivity correction, gamma-correction processing, demosaicing (referred to as a "demosaicing process"), a brightness and color difference signal generation process, a contour highlighting process, color correction, and the like on the read RAW data.

The image data processed as the live view image by the image processing unit 24 is input into a video RAM random access memory (VRAM) 50.

The VRAM 50 includes an A region and a B region. In each of the A region and the B region, image data representing an image of one frame is recorded. In the VRAM 50, the image data representing the image of one frame is alternately rewritten between the A region and the B region. The written image data is read from a region of the A region and the B region of the VRAM 50 other than a region in which the image data is rewritten.

The image data read from the VRAM 50 is encoded in a video encoder 28 and is output to the liquid crystal monitor 30 disposed on the rear surface of the camera. Accordingly, the live view image showing the subject image is displayed on the liquid crystal monitor 30.

The image data (brightness data (Y) and color difference data (Cb) and (Cr)) processed as the still picture or the motion picture for recording by the image processing unit 24 is stored in the memory 48 again.

A compression/expansion processing unit 26 performs a compression process on the brightness data (Y) and the color difference data (Cb) and (Cr) processed by the image processing unit 24 and stored in the memory 48 at the time of recording the still picture or the motion picture. In the case of the still picture, for example, the compression is performed in the Joint Photographic Experts Group (JPEG) format. In the case of the motion picture, for example, the compression is performed in the H.264 format. The compression image data compressed by the compression/expansion processing unit 26 is recorded in the memory card 54 through a media controller 52.

In addition, the compression/expansion processing unit 26 performs an expansion process on the compression image data obtained from the memory card 54 through the media controller 52 at the time of the playback mode. For example, the media controller 52 records and reads the compression image data in the memory card 54.

[Phase Difference AF]

In the case of performing the phase difference AF, the CPU 40 functioning as an autofocus control unit outputs a read instruction for reading the image data of the phase difference pixel row in at least an AF region of the imaging element 16 to a sensor drive unit 32 and reads the corresponding image data from the imaging element 16.

At the time of imaging and displaying the motion picture (including the live view image), the CPU 40 obtains a thinning-out rate for reading the image data from the imaging element 16 in a thinned-out manner. The thinning-out rate may be a preset fixed value or may be able to be selected by a user from a plurality of thinning-out rates. For example, the optimal thinning-out rate can be set in connection with selection of the image size of the motion picture or selection of the frame rate. It is preferable that the rows read in a thinned-out manner include the phase difference pixel row.

The CPU 40 outputs a read instruction indicating a thinning-out pattern (extraction pattern) corresponding to the thinning-out rate to the sensor drive unit 32 and reads the image data from the imaging element 16 in a thinned-out manner.

The phase difference detection unit 42 extracts output data of the phase difference detection pixel (the first phase difference pixel PR and the second phase difference pixel PL) in the AF region from the read phase difference pixel row and detects the phase difference between the output data (first pixel value) of the first phase difference pixel PR and the output data (second pixel value) of the second phase difference pixel PL. For example, the phase difference is obtained from a shift amount in the left-right direction between the first pixel value and the second pixel value when the correlation between the first pixel value and the second pixel value of the pair of the first phase difference pixel PR and the second phase difference pixel PL is the maximum (when the integrating accumulation value of the absolute value of the difference between the pixel values of the pair of the phase difference pixels is the minimum).

A value obtained by correcting the obtained shift amount by a positional deviation in the horizontal direction between the pair of the first phase difference pixel PR and the second phase difference pixel PL can be calculated as the phase difference data. A method of calculating the phase difference is not limited to the above method, and various methods can be applied.

Next, the CPU 40 calculates the deviation amount (defocus amount) between the focus position of the imaging lens 12 (imaging optical system) and the image forming surface of the imaging element 16 based on the phase difference data detected by the phase difference detection unit 42. The calculation of the defocus amount may be performed by the phase difference detection unit 42.

The CPU 40 performs the phase difference AF by moving the focus lens in the imaging lens 12 through the lens drive unit 36 based on the calculated defocus amount such that the defocus amount becomes zero.

In the imaging element 16, the opening portions of the pair of the first phase difference pixel PR and the second phase difference pixel PL are adjacently arranged to face each other. Thus, the interval between the pair of the first phase difference pixel PR and the second phase difference pixel PL is minimized. Accordingly, a spatial sampling frequency of the phase difference can be maximized, and the phase difference AF for the subject having a high spatial frequency can be performed with higher accuracy than that in a case where the pair of the first phase difference pixel and the second phase difference pixel is separately arranged on both sides of the normal pixel.

The rows read from the imaging element 16 in a thinned-out manner at the time of generating the motion picture can include the phase difference pixel row including the phase difference detection pixel (the first phase difference pixel PR and the second phase difference pixel PL). The phase difference AF can be appropriately performed even during imaging of the motion picture.

[Interpolation Processing Unit]

<First Embodiment of Interpolation Processing Unit>

Figure 9:
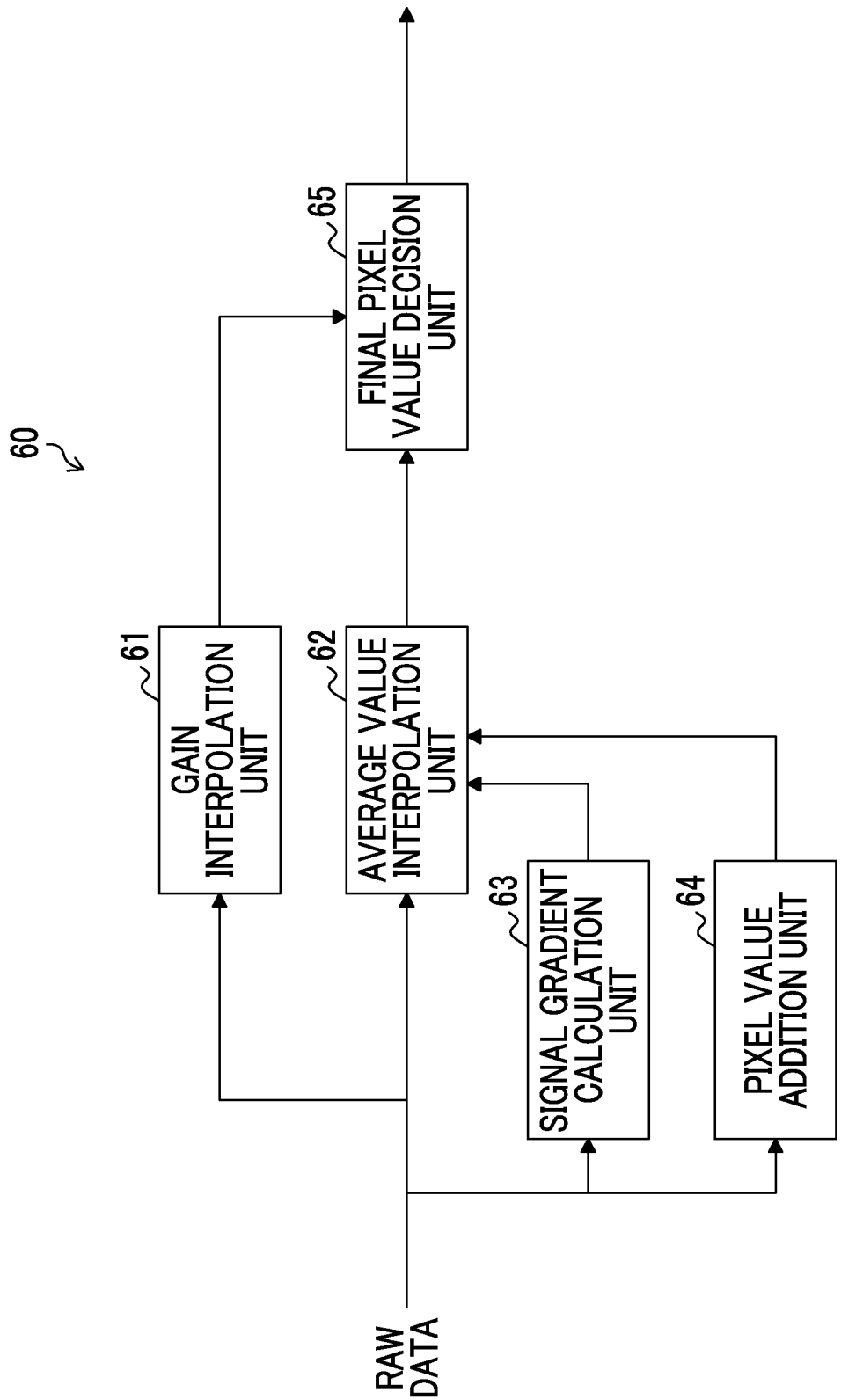
FIG. 9 is a block diagram illustrating a first embodiment of an interpolation processing unit in an image processing unit 24 illustrated in FIG. 3.

FIG. 9 is a block diagram illustrating a first embodiment of an interpolation processing unit in the image processing unit 24 illustrated in FIG. 3.

An interpolation processing unit 60 of the first embodiment illustrated in FIG. 9 is a part correcting (interpolating) the pixel value of the phase difference detection pixel (the first phase difference pixel PR and the second phase difference pixel PL) included in the image data (RAW data) read from the imaging element 16 at the time of switching to the still picture imaging mode and imaging the still picture.

The interpolation processing unit 60 includes a gain interpolation unit 61, an average value interpolation unit 62, a signal gradient calculation unit 63, a pixel value addition unit 64, and a final pixel value decision unit 65.

Approximately half of the intensity of light incident on the surrounding normal pixels is incident on the phase difference detection pixel (the first phase difference pixel PR and the second phase difference pixel PL). Thus, sensitivity is decreased below that of the normal pixel, and the phase difference detection pixel cannot be used as the normal pixel.

The gain interpolation unit 61 functioning as a second interpolation unit performs interpolation in which a signal level is adjusted to that of the normal pixel by multiplying the pixel value of the phase difference detection pixel by predetermined gain interpolation information in order to supplement the decrease in sensitivity of the phase difference detection pixel.

The interpolation processing unit 60 includes a gain interpolation information obtaining unit that obtains the gain interpolation information set for the pixel position of the in-focus pixel in the RAW data in a case where a correction target of the first phase difference pixel PR or the second phase difference pixel PL is set as the in-focus pixel.

The gain interpolation information obtaining unit may calculate the gain interpolation information corresponding to the pixel position of the in-focus pixel based on the RAW data surrounding the in-focus pixel or may obtain the gain interpolation information from a storage unit (ROM 47) storing the gain interpolation information for each pixel position of the in-focus pixel. The gain interpolation information can be calculated as the ratio of the pixel value of the in-focus pixel in the RAW data to the average pixel value of the normal pixels having the same color and surrounding the in-focus pixel.

The average value interpolation unit 62 functioning as a first interpolation unit is a part generating the pixel value at the pixel position of the in-focus pixel using at least one of the pixel values of the normal pixels surrounding the pixel position of the in-focus pixel or the pixel value of the addition pixel of the pair of the first phase difference pixel PR and the second phase difference pixel PL. The average value interpolation unit 62 is provided with information indicating a signal gradient direction calculated by the signal gradient calculation unit 63 and the addition pixel value of the addition pixel added by the pixel value addition unit 64.

The signal gradient calculation unit 63 calculates the signal gradient direction in which the signal gradients of the surrounding pixels of the pixel position of the in-focus pixel are minimized in the case of generating the pixel value at the pixel position of the in-focus pixel.

Figure 10:
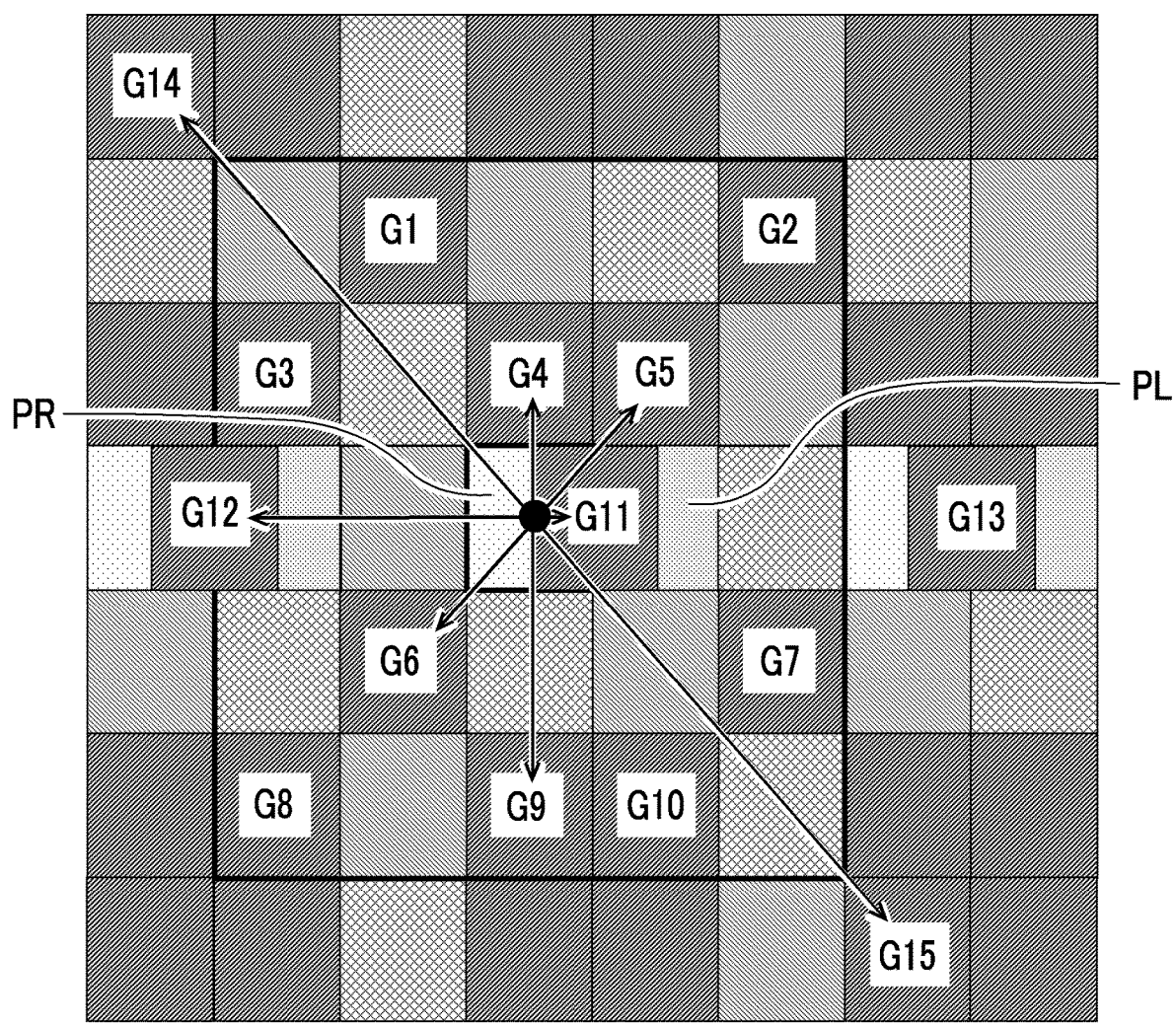
FIG. 10 is a diagram for describing average value interpolation for the phase difference detection pixels in the imaging element of the first embodiment.

FIG. 10 is a diagram for describing the average value interpolation for the phase difference detection pixel (first phase difference pixel PR) in the imaging element of the first embodiment.

In FIG. 10, in a case where the first phase difference pixel PR is set as the in-focus pixel, 10 G pixels (G1 to G10) are present in the range of 5×5 pixels with the in-focus pixel at the center. In addition, G11, G12, and G13 denote the addition pixels corresponding to the G pixels.

As illustrated in FIG. 10, in the case of calculating the signal gradient direction based on the pixels surrounding the in-focus pixel (first phase difference pixel PR), the signal gradient calculation unit 63 obtains the pixel values of the G pixels surrounding the in-focus pixel and calculates the signal gradient of the horizontal direction from the pixel interval and the difference between the pixel values of two G pixels (for example, G4 and G5) in the horizontal direction (first direction). In the same manner, the signal gradient calculation unit 63 calculates the signal gradient of the vertical direction from the pixel interval and the difference between the pixel values of two G pixels (for example, G4 and G9) in the vertical direction (second direction), calculates the signal gradient of a +45 degree direction from the pixel interval and the difference between the pixel values of two G pixels (for example, G2 and G5) in the +45 degree direction (third direction), and calculates the signal gradient of a −45 degree direction from the pixel interval and the difference between the pixel values of two G pixels (for example, G1 and G4) in the −45 degree direction (fourth direction). The pixels used in the calculation of the signal gradients are not limited to the above example. For example, G pixels of 2×2 pixels close to the in-focus pixel may be used.

The signal gradient calculation unit 63 calculates the direction of the signal gradient in which the signal gradient is the minimum among the above calculated signal gradients of the four directions as the signal gradient direction.

The use of the pixel value of the G pixel in the calculation of the signal gradient direction is because the pixel value of the G pixel most contributes to obtaining the brightness signal (Y) among the pixel values of the R pixel, the G pixel, and the B pixel. The signal gradient direction calculated in the above manner corresponds to a direction having the highest correlation with the brightness among the four directions.

The pixel value addition unit 64 generates the pixel value of the virtual G pixel (addition pixel) at the pixel position between the first phase difference pixel PR and the second phase difference pixel PL by adding the pixel values of the pair of the first phase difference pixel PR and the second phase difference pixel PL.

As described using FIG. 6 and FIG. 8, in a case where the pixel values of the pair of the first phase difference pixel PR and the second phase difference pixel PL are added, the added pixel value (addition pixel value) is equal to the pixel value of the normal pixel (G pixel) at the same pixel position. In addition, the addition pixel can be regarded as being present between the pair of the first phase difference pixel PR and the second phase difference pixel PL. The addition pixel value of the addition pixel generated by the pixel value addition unit 64 is output to the average value interpolation unit 62.

In the case of performing the interpolation operation on the pixel value at the pixel position of the in-focus pixel, the average value interpolation unit 62 detects a plurality of G pixels (including the addition pixel corresponding to the G pixel) that are present in the signal gradient direction calculated by the signal gradient calculation unit 63 with the pixel position of the in-focus pixel as a reference and have the same color as the color at the pixel position of the in-focus pixel, and generates the pixel value at the pixel position of the in-focus pixel by interpolating the pixel values of the plurality of detected G pixels.

As illustrated in FIG. 10, in a case where the signal gradient direction is the horizontal direction, the average value interpolation unit 62 generates the pixel value at the pixel position of the in-focus pixel by interpolating (calculating a weighted average depending on a distance) the pixel value of the addition pixel (G11 and G12) corresponding to the G pixel in the horizontal direction. In a case where the signal gradient direction is the horizontal direction, the normal pixel (G pixel) is not present in the horizontal direction of the in-focus pixel. Thus, the average value interpolation uses only the addition pixel.

In a case where the signal gradient direction is the vertical direction, the average value interpolation unit 62 generates the pixel value at the pixel position of the in-focus pixel by interpolating two G pixels (G4 and G9) in the vertical direction. In a case where the signal gradient direction is the +45 degree direction, the average value interpolation unit 62 generates the pixel value at the pixel position of the in-focus pixel by interpolating two G pixels (G5 and G6) in the +45 degree direction.

In addition, in a case where the signal gradient direction is the −45 degree direction, the average value interpolation unit 62 can generate the pixel value at the pixel position of the in-focus pixel by interpolating two G pixels (G14 and G15) in the −45 degree direction. In this case, the G pixels of G14 and G15 are pixels (relatively separated pixels) in the range of 5×5 pixels with the in-focus pixel at the center. Thus, it is considered that interpolation accuracy is decreased.

In a case where the signal gradient direction is the −45 degree direction, the average value interpolation unit 62 may generate the pixel value at the pixel position of the in-focus pixel by interpolating the pixel values of two pixels of G4 and G11, three pixels of G4, G11, and G6, four pixels of G4, G11, G6, and G9, or the pixels of two sets of G1 and G7 and G3 and G10 in the −45 degree direction. Alternatively, the average value interpolation unit 62 may employ the pixel value of the addition pixel (G11).

In a case where the in-focus pixel is the second phase difference pixel PL, the average value interpolation unit 62 can perform the interpolation operation on the pixel value for imaging at the pixel position of the second phase difference pixel PL in the same manner as described above. In addition, in the case of performing the average value interpolation depending on the signal gradient direction, pixels used in the average value interpolation are not limited to the above example.

The final pixel value decision unit 65 decides the final pixel value at the pixel position of the in-focus pixel by selecting any one of pixel values including the pixel value interpolated by the gain interpolation unit 61 and the pixel value interpolated by the average value interpolation unit 62 or generating a pixel value obtained by weighted addition of two pixel values. For example, in a case where the image surrounding the in-focus pixel is even, the pixel value obtained by the average value interpolation is preferred. In a case where the spatial frequency of the image surrounding the in-focus pixel is high, the pixel value obtained by the gain interpolation is preferred. In addition, in a region out of focus, the pixel value obtained by the average value interpolation is preferred.

As described above, the interpolation processing unit 60 corrects (interpolates) the pixel value of the phase difference detection pixel included in the RAW data read from the imaging element 16 at the time of imaging the still picture. Accordingly, the RAW data of the still picture in which the pixel value at the pixel position of the phase difference detection pixel is corrected is generated.

<Second Embodiment of Interpolation Processing Unit>

Figure 11:
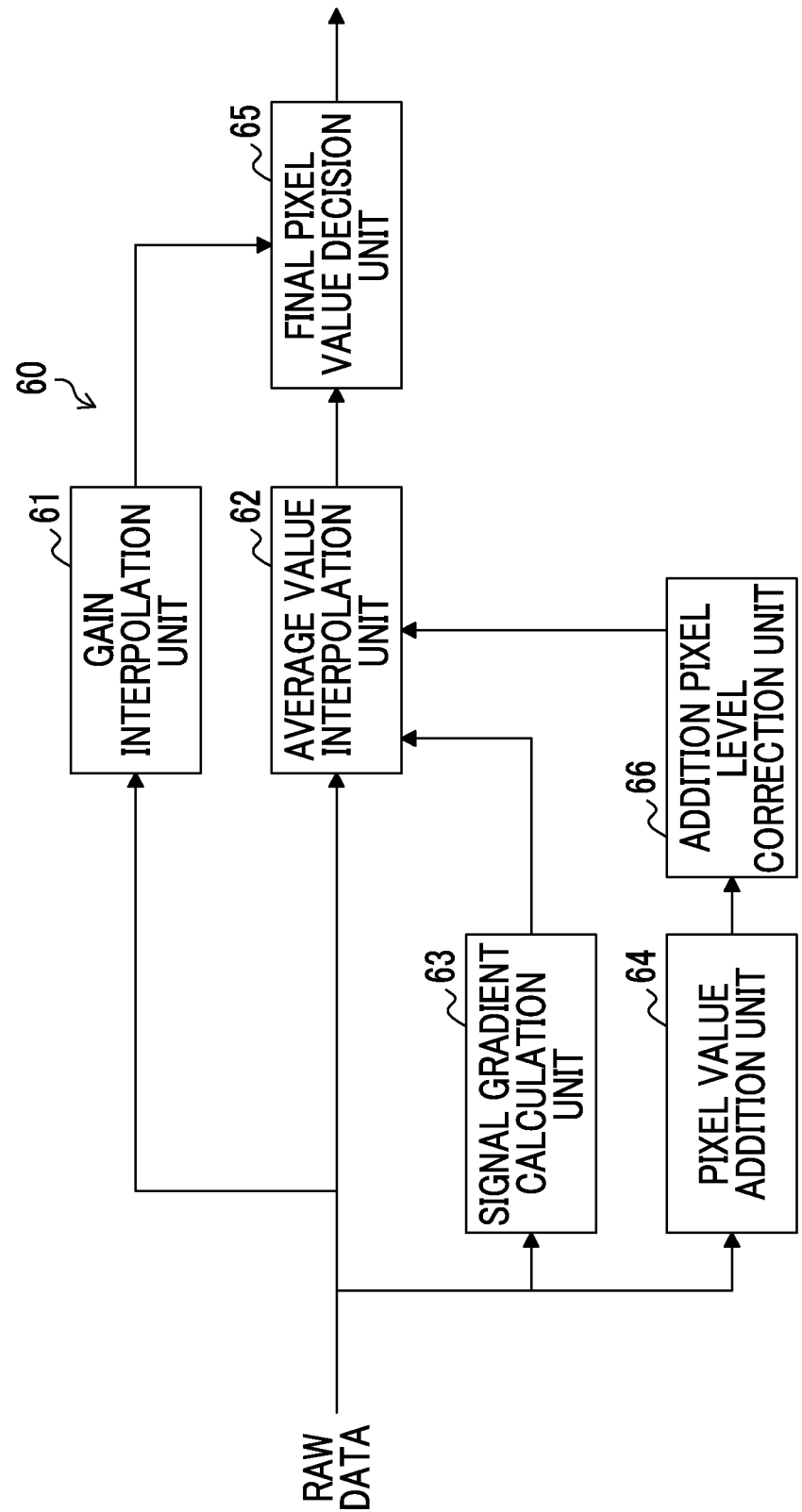
FIG. 11 is a block diagram illustrating a second embodiment of the interpolation processing unit in the image processing unit 24 illustrated in FIG. 3.

FIG. 11 is a block diagram illustrating a second embodiment of the interpolation processing unit in the image processing unit 24 illustrated in FIG. 3. In FIG. 11, common parts in the first embodiment illustrated in FIG. 9 will be designated by the same reference signs, and detailed description of such parts will not be repeated.

The interpolation processing unit 60 of the second embodiment illustrated in FIG. 11 is different from the first embodiment illustrated in FIG. 9 in that an addition pixel level correction unit 66 is added.

In FIG. 11, the addition pixel value (PA (=PL+PR)) obtained by adding the pixel values of the pair of the first phase difference pixel PR and the second phase difference pixel PL by the pixel value addition unit 64 is a value close to the pixel value (G) of the normal pixel (G pixel) at the same pixel position but does not match in a strict sense.

The addition pixel level correction unit 66 reads a level adjustment coefficient (K) corresponding to the pixel position of the in-focus pixel from a storage unit (ROM 47) storing the level adjustment coefficient in advance or calculates the level adjustment coefficient (K) by analyzing the image data. The addition pixel level correction unit 66 multiplies the addition pixel value (PA) added by the pixel value addition unit 64 by the read or calculated level adjustment coefficient (K) and outputs the multiplied (level is adjusted) addition pixel value ((PA×K)=G) to the average value interpolation unit 62 as the pixel value (G) corresponding to the G pixel of the normal pixel.

According to the second embodiment, the addition pixel value is adjusted by multiplying the addition pixel value (PA (=PL+PR)) obtained by adding the pixel values of the pair of the first phase difference pixel PR and the second phase difference pixel PL by the level adjustment coefficient (K). Thus, the addition pixel value (PA×K) after adjustment can be set to completely match the pixel value (G) of the normal pixel (G pixel) that may be obtained in a case where the normal pixel is present at the same pixel position. High accuracy interpolation can be performed in the case of using the addition pixel value in the average value interpolation.

<Third Embodiment of Interpolation Processing Unit>

Figure 12:
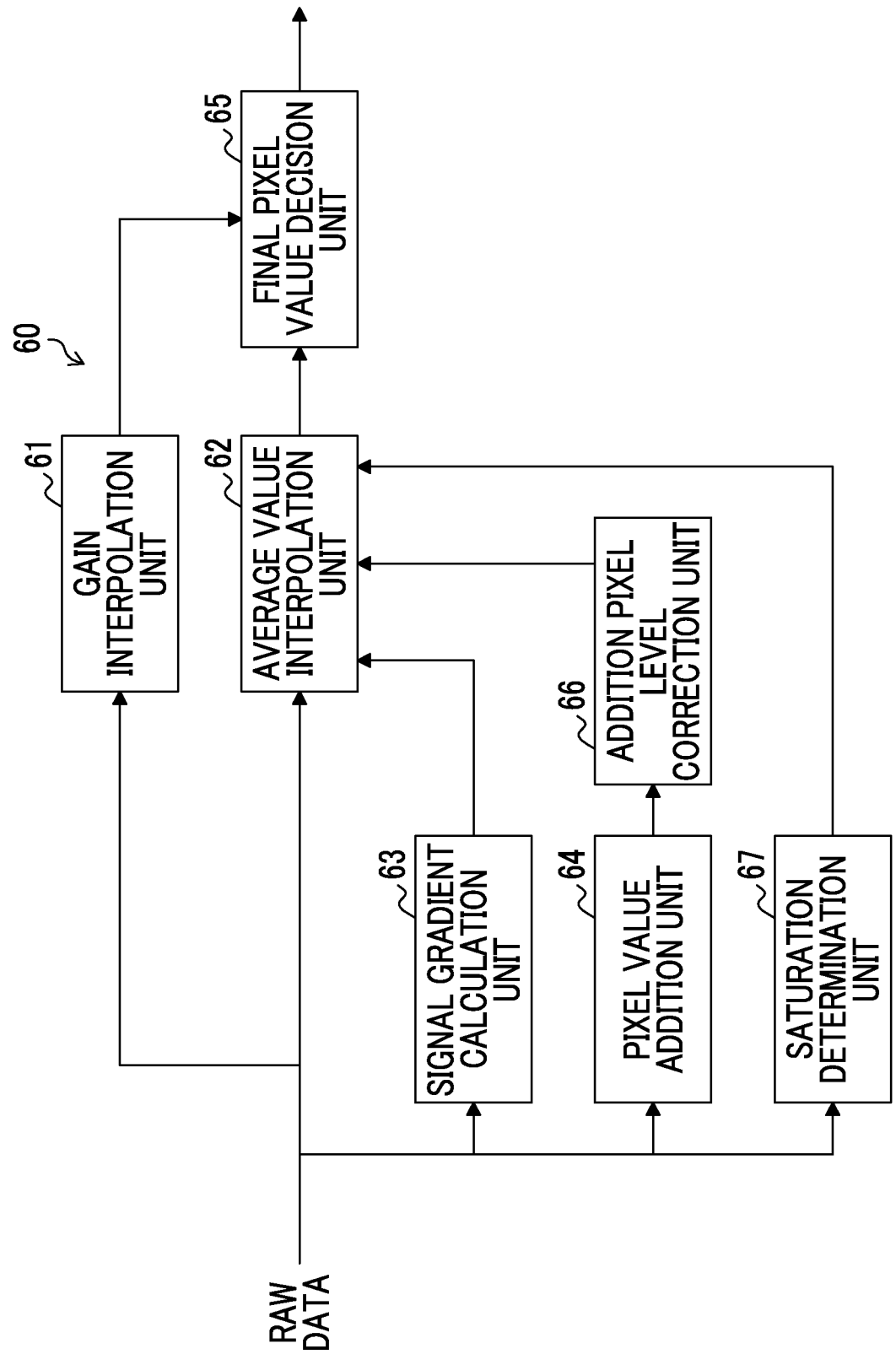
FIG. 12 is a block diagram illustrating a third embodiment of the interpolation processing unit in the image processing unit 24 illustrated in FIG. 3.

FIG. 12 is a block diagram illustrating a third embodiment of the interpolation processing unit in the image processing unit 24 illustrated in FIG. 3. In FIG. 12, common parts in the second embodiment illustrated in FIG. 11 will be designated by the same reference signs, and detailed description of such parts will not be repeated.

The interpolation processing unit 60 of the third embodiment illustrated in FIG. 12 is mainly different from the second embodiment illustrated in FIG. 11 in that a saturation determination unit 67 is added.

The saturation determination unit 67 determines saturation of at least one of the in-focus pixel which is the interpolation target, the first phase difference pixel PR or the second phase difference pixel PL adjacent to the in-focus pixel, or the normal pixel (G pixel) adjacent to the in-focus pixel. The saturation determination unit 67 outputs the determination result to the average value interpolation unit 62.

A case where strong light is incident on the G pixel adjacent to the in-focus pixel and the G pixel is saturated is considered.

In a case where the G pixel is saturated and any or both of the first phase difference pixel PR and the second phase difference pixel PL are not saturated, a relationship G<PA×K is generally satisfied. In a case where the addition pixel value (PA×K) after adjustment exceeds a saturation level, the addition pixel is set to match the G pixel by clipping the addition pixel value based on the saturation level, and a problem does not particularly arise. However, in a case where the value of the level adjustment coefficient (K) for adjusting the addition pixel value (PA) cannot be correctly set, the addition pixel value (PA×K) after adjustment may not exceed the saturation level even in a case where the G pixel is saturated. In this case, a level difference in signal is present between the addition pixel and the surrounding G pixels. In such a case, the average value interpolation unit 62 should not use the addition pixel in the average value interpolation.

Figure 14:
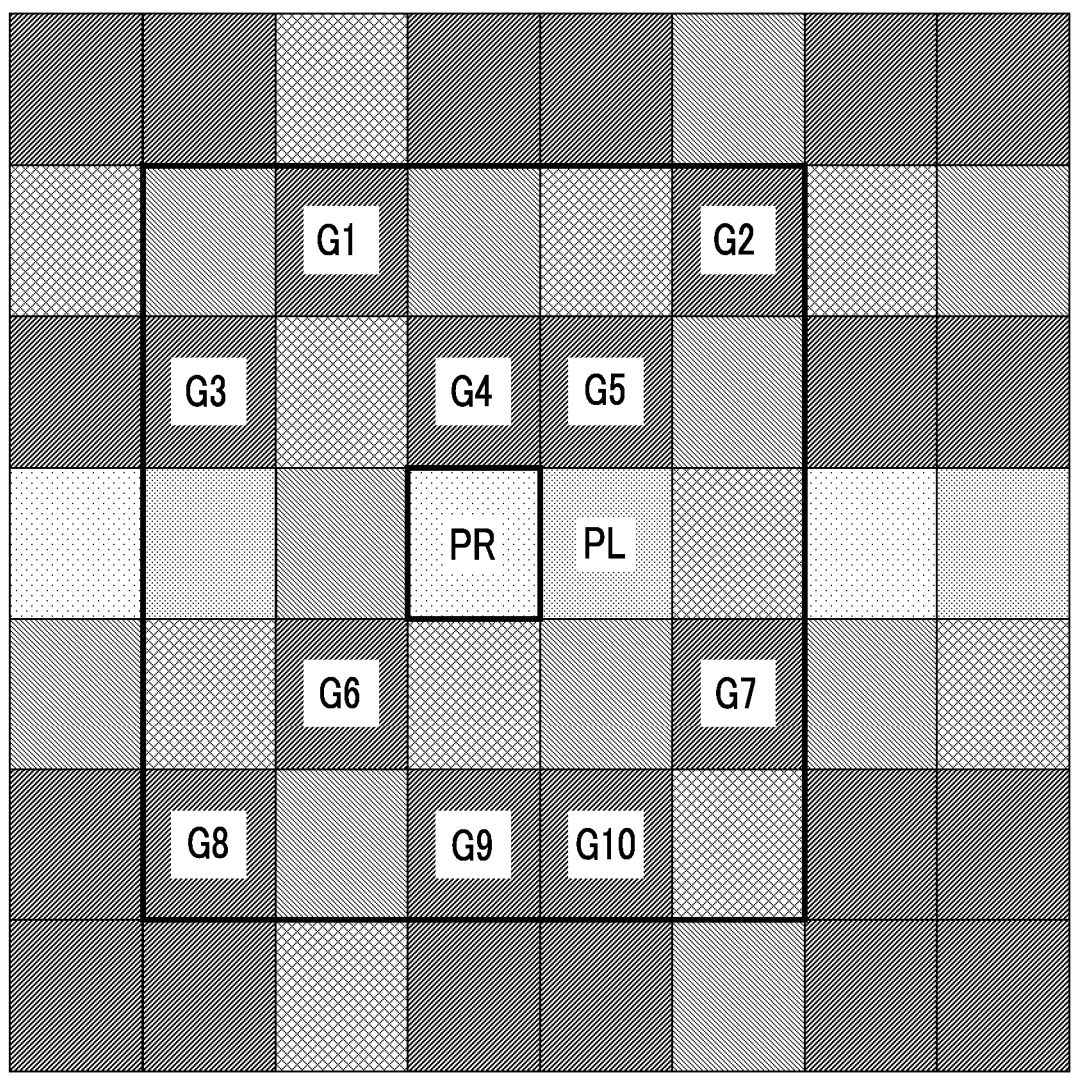
FIG. 14 is a diagram illustrating a 5×5 pixel window with an in-focus pixel (first phase difference pixel PR) at the center and a plurality of G pixels (G1 to G10) in the window.

As illustrated in FIG. 14, for example, when the first phase difference pixel PR is set as the in-focus pixel, the addition pixel adjacent to the in-focus pixel is not used in the average value interpolation in a case where the surrounding G pixels, for example, any or all of the G4, G5, and G6, are saturated.

In addition, an assumption G=PA or G=PA×K corresponds to a case where the intensity of incidence ray on the G pixel and the intensity of incidence ray on the first phase difference pixel PR and the second phase difference pixel PL are constant (in a case where a monochrome subject is imaged). In a case where a high frequency signal pattern is imaged and high frequency strong light is incident on the in-focus pixel and the first phase difference pixel PR or the second phase difference pixel PL adjacent to the in-focus pixel, these pixels may be saturated even in a case where the G pixels adjacent to the in-focus pixel are not saturated. In this case, the addition pixel value is not reliable, and the assumption G=PA or G=PA×K is not established. Thus, the addition pixel should not be used in the interpolation.

Therefore, in a case where at least one of the first phase difference pixel PR or the second phase difference pixel PL exceeds a predetermined saturation level SATLEV, the addition pixel adjacent to the in-focus pixel is not used in the average value interpolation. For example, in a case where the depth of the pixels of the RAW data output from the imaging element 16 is 16 bits (representing 0 to 65535), SATLEV is set to 65000 or the like.

In a case where the determination result indicating that at least one of the in-focus pixel which is the interpolation target, the first phase difference pixel PR or the second phase difference pixel PL adjacent to the in-focus pixel, or the normal pixel (G pixel) adjacent to the in-focus pixel is saturated is input into the average value interpolation unit 62 from the saturation determination unit 67, the average value interpolation unit 62 does not use the addition pixel in the average value interpolation. That is, in a case where the saturation determination unit 67 determines that at least one pixel of the in-focus pixel which is the interpolation target, the first phase difference pixel PR or the second phase difference pixel PL adjacent to the in-focus pixel, or the G pixel adjacent to the in-focus pixel is saturated, the average value interpolation unit 62 uses only the normal pixel (G pixel) in the average value interpolation.

According to the third embodiment, in the case of using the addition pixel in order to increase the accuracy of the average value interpolation, the addition pixel is not used in the average value interpolation on condition that using the addition pixel causes signal saturation causing a decrease in image quality. Thus, the interpolation accuracy of the average value interpolation can be maintained (image quality can be maintained).

<Fourth Embodiment of Interpolation Processing Unit>

Figure 13:
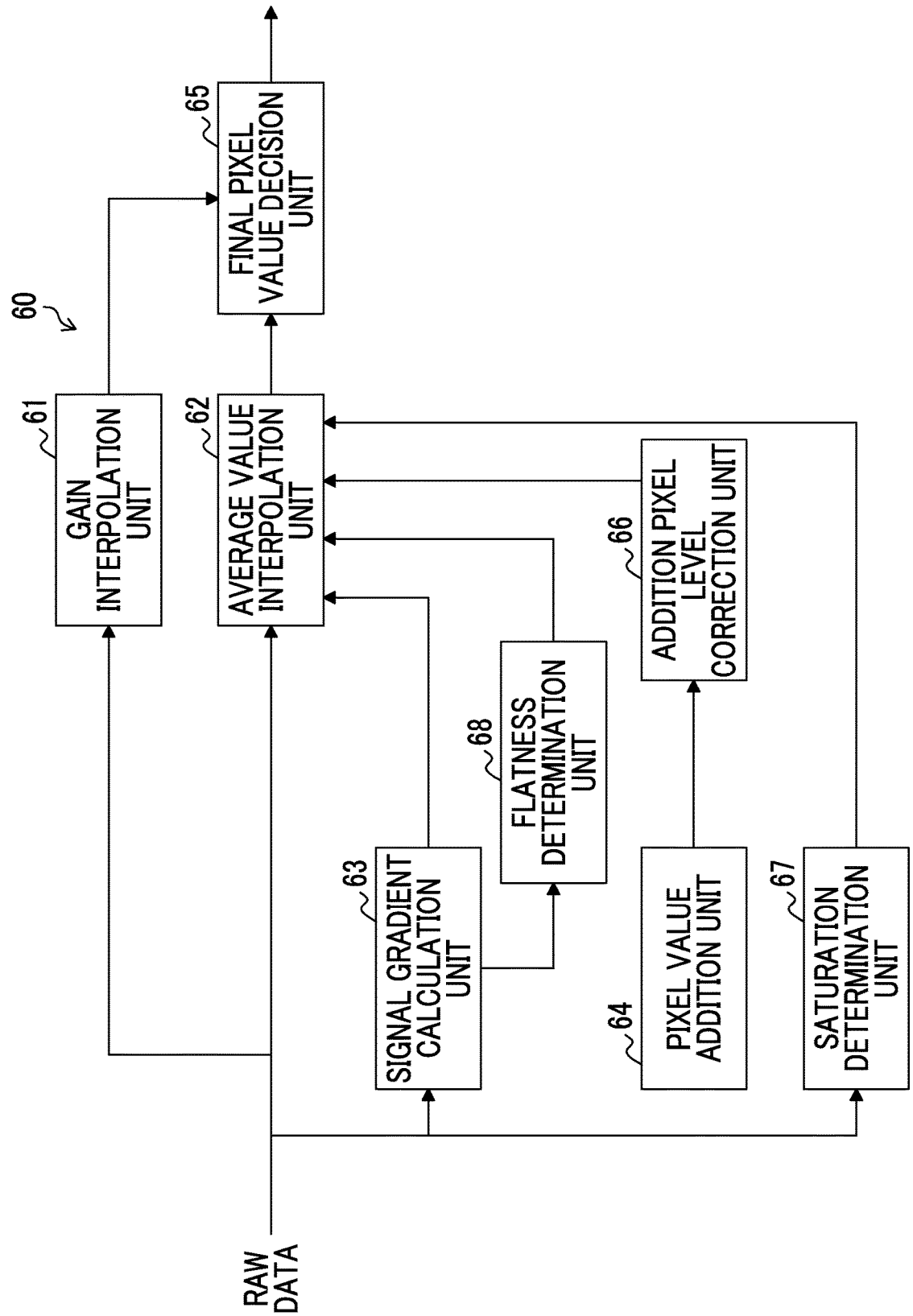
FIG. 13 is a block diagram illustrating a fourth embodiment of the interpolation processing unit in the image processing unit 24 illustrated in FIG. 3.

FIG. 13 is a block diagram illustrating a fourth embodiment of the interpolation processing unit in the image processing unit 24 illustrated in FIG. 3. In FIG. 13, common parts in the third embodiment illustrated in FIG. 12 will be designated by the same reference signs, and detailed description of such parts will not be repeated.

The interpolation processing unit 60 of the fourth embodiment illustrated in FIG. 13 is mainly different from the third embodiment illustrated in FIG. 12 in that a flatness determination unit 68 is added.

The flatness determination unit 68 calculates flatness of an image in a predetermined window with the pixel position of the in-focus pixel as a reference and determines whether or not the image in the window is flat using the calculated flatness.

Information indicating the signal gradients of four directions (the horizontal direction, the vertical direction, the +45 degree direction, and the −45 degree direction) calculated by the signal gradient calculation unit 63 are input into the flatness determination unit 68 of the present example. The flatness determination unit 68 calculates the maximum signal gradient among the signal gradients of four directions and determines that the image in the predetermined window is flat in a case where the calculated maximum signal gradient is less than or equal to a threshold (first threshold) for determining the flatness.

In addition, the flatness determination unit 68 is not limited to the above example. As illustrated in FIG. 14, in a case where a range of 5×5 pixels with the in-focus pixel (in FIG. 14, the first phase difference pixel PR) at the center is set as the predetermined window, the flatness determination unit 68 may calculate a standard deviation or a variance of the pixel values of a plurality of G pixels (10 G pixels of G1 to G10) in the window and may determine that the image in the window is flat in a case where the calculated standard deviation or variance is less than or equal to a threshold (second threshold) for determining the flatness. The size of the window is not limited to the range of 5×5 pixels and can be set to M×N pixels (M and N are preferably odd numbers greater than or equal to 3).

In a case where the determination result indicating that the image in the predetermined window with the pixel position of the in-focus pixel, which is the interpolation target, as a reference is flat is input into the average value interpolation unit 62 from the flatness determination unit 68, the average value interpolation unit 62 does not use the addition pixel in the average value interpolation. That is, in a case where the flatness determination unit 68 determines that the image in the predetermined window is flat, the average value interpolation unit 62 uses only the normal pixel (G pixel) in the average value interpolation.

In addition, in a case where the flatness determination unit 68 determines that the image in the predetermined window is flat, the average value interpolation unit 62 may not use the pixel that is used in the average value interpolation based on the signal gradient direction calculated by the signal gradient calculation unit 63. Alternatively, the average value interpolation may be performed using all G pixels or a part of G pixels in the window.

In a case where a level difference in signal is present between the addition pixel and the normal pixel (in the present example, the G pixel), using the addition pixel in the average value interpolation causes the in-focus pixel subjected to the average value interpolation to have a different pixel value from the G pixel in the flat image. Particularly, the in-focus pixel is likely to stand out in the flat image.

Therefore, in a case where the flatness determination unit 68 determines that the image in the predetermined window is flat, the average value interpolation unit 62 performs the average value interpolation without using the addition pixel. In the case of performing the average value interpolation by weighting the normal pixel and the addition pixel, a weight for the addition pixel may be set to be small.

According to the fourth embodiment, in the case of using the addition pixel in order to increase the accuracy of the average value interpolation, the average value interpolation is performed using only the normal pixel (or by decreasing the weight of the addition pixel) in a flat portion of the image where erroneous correction is likely to stand out in a case where a level difference in signal is present between the addition pixel and the normal pixel. Thus, a decrease in image quality can be prevented.

[Image Processing Method]

Figure 15:
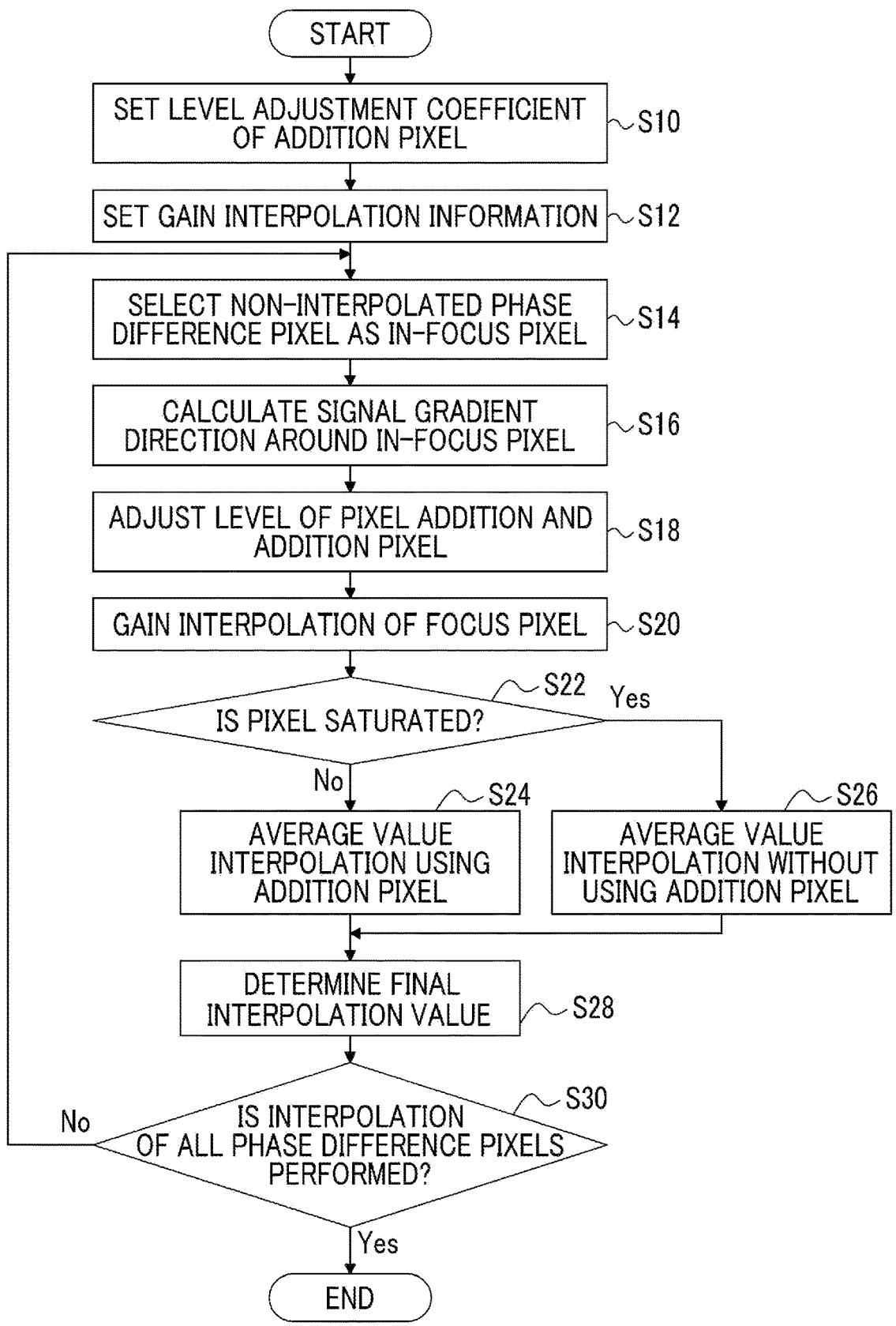
FIG. 15 is a flowchart illustrating an image processing method according to a first embodiment of the present invention.

FIG. 15 is a flowchart illustrating an image processing method according to a first embodiment of the present invention and particularly, illustrates a process procedure in the interpolation processing unit 60 illustrated in FIG. 12.

In FIG. 15, the addition pixel level correction unit 66 illustrated in FIG. 12 sets the level adjustment coefficient (K) of the addition pixel (step S10). The addition pixel level correction unit 66 can set the preset level adjustment coefficient (K) or the level adjustment coefficient (K) calculated by analyzing the RAW data.

In addition, the gain interpolation information obtaining unit included in the gain interpolation unit 61 reads the gain interpolation information from the storage unit (ROM 47) storing the gain interpolation information in advance or calculates the gain interpolation information by analyzing the image data and sets the read or calculated gain interpolation information (step S12).

The interpolation processing unit 60 selects a non-interpolated phase difference pixel (the first phase difference pixel PR or the second phase difference pixel PL) as the in-focus pixel (step S14).

The signal gradient calculation unit 63 calculates the signal gradient directions around the in-focus pixel selected in step S14 based on the pixel values of the G pixels surrounding the in-focus pixel (step S16).

In addition, the pixel value addition unit 64 adds the pixel values of the pair of the first phase difference pixel PR and the second phase difference pixel PL. The addition pixel level correction unit 66 adjusts the level of the addition pixel by multiplying the addition pixel value of the addition pixel by the level adjustment coefficient set in step S10 (step S18).

The gain interpolation unit 61 performs the gain interpolation in which the signal level is adjusted to that of the normal pixel by multiplying the pixel value of the in-focus pixel set in step S14 by the gain interpolation information set in step S12 (step S20).

The average value interpolation unit 62 determines whether or not the pixel (at least one pixel of the in-focus pixel, the first phase difference pixel PR or the second phase difference pixel PL adjacent to the in-focus pixel, or the normal pixel (G pixel) adjacent to the in-focus pixel) is saturated based on the determination result input from the saturation determination unit 67 (step S22). In a case where it is determined that the pixel is not saturated (in the case of "No"), the pixel value for imaging at the pixel position of the in-focus pixel is calculated (subjected to the average value interpolation) using the normal pixels (G pixels) surrounding the in-focus pixel and also the addition pixel of which the level is adjusted in step S18 (step S24; interpolation step). In a case where it is determined that the pixel is saturated (in the case of "Yes"), the pixel value for imaging at the pixel position of the in-focus pixel is calculated (subjected to the average value interpolation) using only the normal pixels (G pixels) surrounding the in-focus pixel without using the addition pixel of which the level is adjusted in step S18 (step S26; interpolation step).

The final pixel value decision unit 65 selects any one pixel value of the pixel value subjected to the gain interpolation in step S20 or the pixel value subjected to the average value interpolation in step S24 or step S26 or generates a pixel value obtained by weighted addition of the two pixel values, and decides the final interpolation value (final pixel value) at the pixel position of the in-focus pixel (step S28).

The interpolation processing unit 60 determines whether or not the interpolation (generation of the pixel value) of all phase difference pixels (the first phase difference pixel PR and the second phase difference pixel PL) in the imaging element 16 is finished (step S39). In a case where the interpolation of all phase difference pixels is not finished (in the case of "No"), the interpolation processing unit 60 returns to step S14, and the processes of step S14 to step S28 are repeated. In a case where the interpolation of all phase difference pixels is finished (in the case of "Yes"), the process of the interpolation processing unit 60 is finished.

According to the image processing method of the first embodiment, the accuracy of the average value interpolation can be increased using the addition pixel. In addition, the addition pixel is not used in the average value interpolation on condition that signal saturation causing a decrease in image quality is caused by using the addition pixel. Thus, the interpolation accuracy of the average value interpolation can be maintained (image quality can be maintained).

Figure 16:
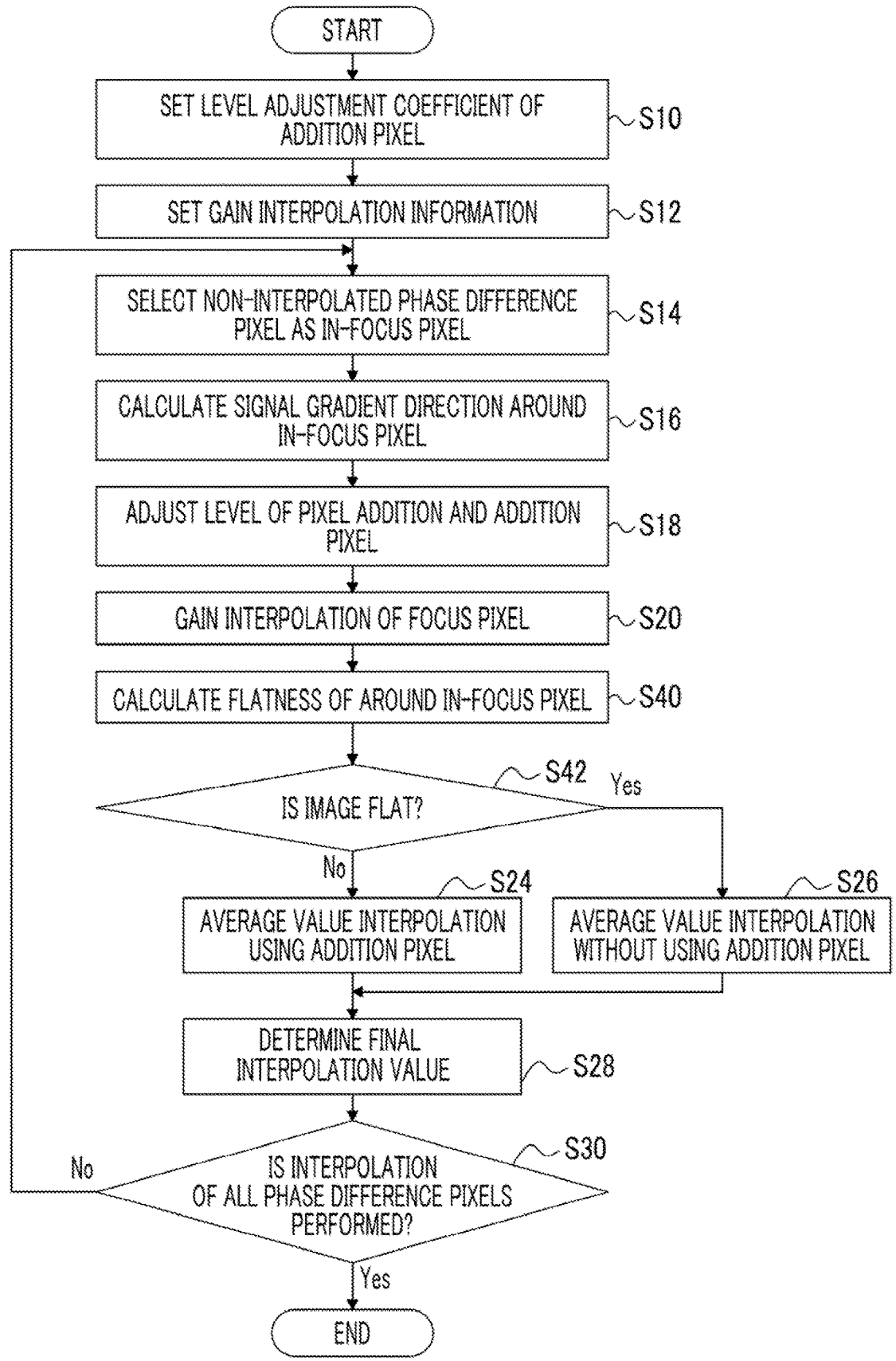
FIG. 16 is a flowchart illustrating an image processing method according to a second embodiment of the present invention.

FIG. 16 is a flowchart illustrating an image processing method according to a second embodiment of the present invention and particularly, illustrates a process procedure in the interpolation processing unit 60 illustrated in FIG. 13.

In FIG. 16, common steps in the first embodiment illustrated in FIG. 15 will be designated by the same step numbers, and detailed description of such steps will not be repeated.

The image processing method of the second embodiment illustrated in FIG. 16 is different from the first embodiment in that processes of step S40 and step S42 are performed instead of the process of step S22 of the first embodiment illustrated in FIG. 15.

The flatness determination unit 68 illustrated in FIG. 13 calculates the flatness of the image in the predetermined window with the pixel position of the in-focus pixel as a reference (step S40) and outputs the determination result indicating whether or not the image in the window is flat using the calculated flatness to the average value interpolation unit 62 (step S40).

In a case where it is determined that the image surrounding the pixel position of the in-focus pixel (in the predetermined window) is not flat based on the determination result input from the flatness determination unit 68 (in the case of "No"), the average value interpolation unit 62 transitions to step S24. In a case where it is determined that the image is flat (in the case of "Yes"), the average value interpolation unit 62 transitions to step S26 (step S42). In step S24, the average value interpolation unit 62 performs the average value interpolation on the in-focus pixel using the normal pixels (G pixels) surrounding the in-focus pixel and also the addition pixel. In step S26, the average value interpolation unit 62 performs the average value interpolation on the in-focus pixel using only the normal pixels (G pixels) surrounding the in-focus pixel without using the addition pixel.

According to the image processing method of the second embodiment, the accuracy of the average value interpolation can be increased using the addition pixel. In addition, the addition pixel is not used in the average value interpolation in the flat portion of the image where erroneous correction is likely to stand out and causes a decrease in image quality in a case where the erroneous correction (erroneous interpolation) is performed using the addition pixel. Thus, the interpolation accuracy (image quality) of the average value interpolation can be maintained.

<Second Embodiment of Imaging Element>

Figures 17, 18:
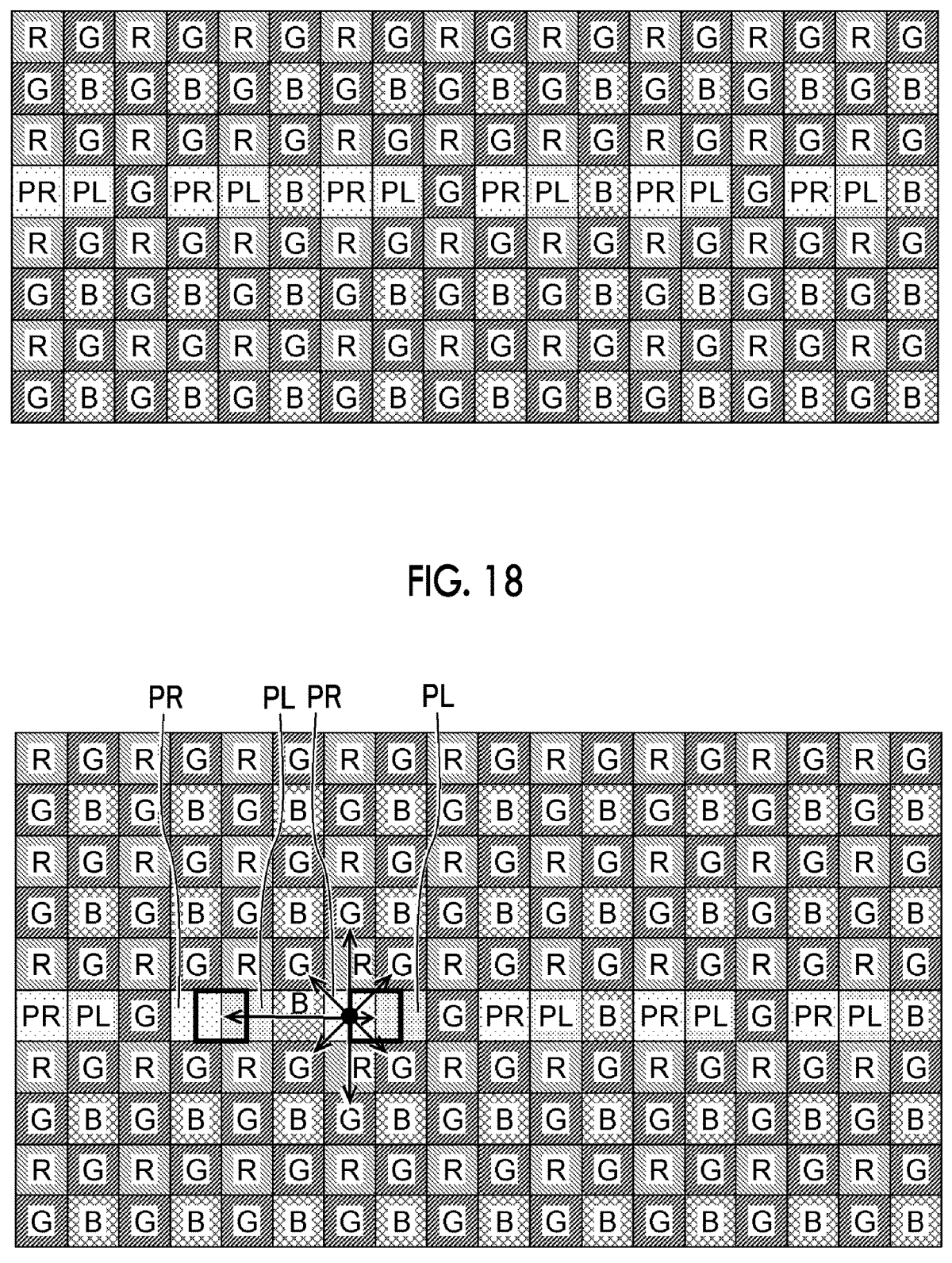

FIG. 17 is a diagram illustrating a second embodiment of color filter arrangement and arrangement of the phase difference detection pixels in the imaging element 16.

The first periodic color arrangement of the color filters of the imaging element 16 of the second embodiment is the general Bayer arrangement.

In the imaging element 16 having the Bayer arrangement, normal pixel rows in which only the normal pixels are arranged in the horizontal direction (row direction) include an RG row in which a pixel (R pixel) having the R filter and a pixel (G pixel) having the G filter are alternately arranged in the row direction, and a GB row in which the G pixel and a pixel (B pixel) having the B filter are alternately arranged in the row direction. In addition, the RG row and the GB row are alternately arranged in the vertical direction (column direction).

In addition, the imaging element 16 of the second embodiment includes the phase difference pixel row in which the first phase difference pixel PR and the second phase difference pixel PL are disposed, and the normal pixel row in which only the normal pixels are disposed.

The phase difference pixel row of the imaging element 16 illustrated in FIG. 17 is configured by periodically arranging three pixels including the pair of the first phase difference pixel PR and the second phase difference pixel PL and one normal pixel as one cycle in the row direction in a specific GB row of the Bayer arrangement. Accordingly, in the phase difference pixel row, the G pixel and the B pixel are alternately arranged in the row direction at an interval of two pixels (the pair of the first phase difference pixel PR and the second phase difference pixel PL). While the phase difference pixel row of the present example is disposed in the GB row of the Bayer arrangement, the phase difference pixel row is not for limitation purposes and may be disposed in the RG row.

In addition, for example, while the G filter is arranged in each of the first phase difference pixel PR and the second phase difference pixel PL of the present example, the G filter may not be arranged, and light in a wavelength range wider than the transmission wavelength range of the G filter may be set to incident on the first phase difference pixel PR and the second phase difference pixel PL.

In a case where the pixel values of the pair of the first phase difference pixel PR and the second phase difference pixel PL in the phase difference pixel row are added, the added pixel value of the pixels (addition pixel value) is almost equal to the pixel value of the normal pixel (G pixel). In addition, the added pixel (addition pixel) can be regarded as being present between the pair of the first phase difference pixel PR and the second phase difference pixel PL.

The "average value interpolation" of the phase difference pixel can be performed using a plurality of normal pixels present around the focused phase difference detection pixel (the first phase difference pixel PR or the second phase difference pixel PL) and the addition pixel in the same manner as the imaging element 16 of the second embodiment having the X-Trans arrangement.

FIG. 18 is a diagram for describing the average value interpolation for the phase difference detection pixel in the imaging element of the second embodiment.

The in-focus pixel which is the interpolation target illustrated in FIG. 18 is the first phase difference pixel PR. The position of the in-focus pixel corresponds to the position of the G pixel.

In a case where the position of the in-focus pixel corresponds to the position of the G pixel, the average value interpolation unit 62 illustrated in FIG. 9 performs the interpolation operation on the pixel value of the in-focus pixel using the addition pixel value of the addition pixel calculated by the pixel value addition unit 64 as the pixel value of one pixel of the pixels surrounding the in-focus pixel.

In a case where the signal gradient direction calculated by the signal gradient calculation unit 63 is the horizontal direction, the average value interpolation unit 62 generates the pixel value at the pixel position of the in-focus pixel by interpolating (calculating the weighted average depending on the distance) the addition pixel value of the addition pixel (two addition pixels illustrated by thick frames in FIG. 18) corresponding to the G pixel in the horizontal direction.

In addition, in a case where the signal gradient direction calculated by the signal gradient calculation unit 63 is the vertical direction, the average value interpolation unit 62 generates the pixel value at the pixel position of the in-focus pixel by interpolating the pixel value of the G pixel in the vertical direction (two G pixels illustrated by arrows in the vertical direction).

Similarly, in a case where the signal gradient direction calculated by the signal gradient calculation unit 63 is the +45 degree direction, the average value interpolation unit 62 generates the pixel value at the pixel position of the in-focus pixel by interpolating the G pixel in the +45 degree direction (two G pixels illustrated by arrows in the +45 degree direction). In a case where the signal gradient direction is the −45 degree direction, the average value interpolation unit 62 generates the pixel value at the pixel position of the in-focus pixel by interpolating the G pixel in the −45 degree direction (two G pixels illustrated by arrows in the −45 degree direction).

In a case where the normal pixels surrounding the in-focus pixel are saturated, or, for example, in the case of an image in which the surrounding area of the in-focus pixel is even, it is preferable not to use the addition pixel value in the average value interpolation.

Figure 19:
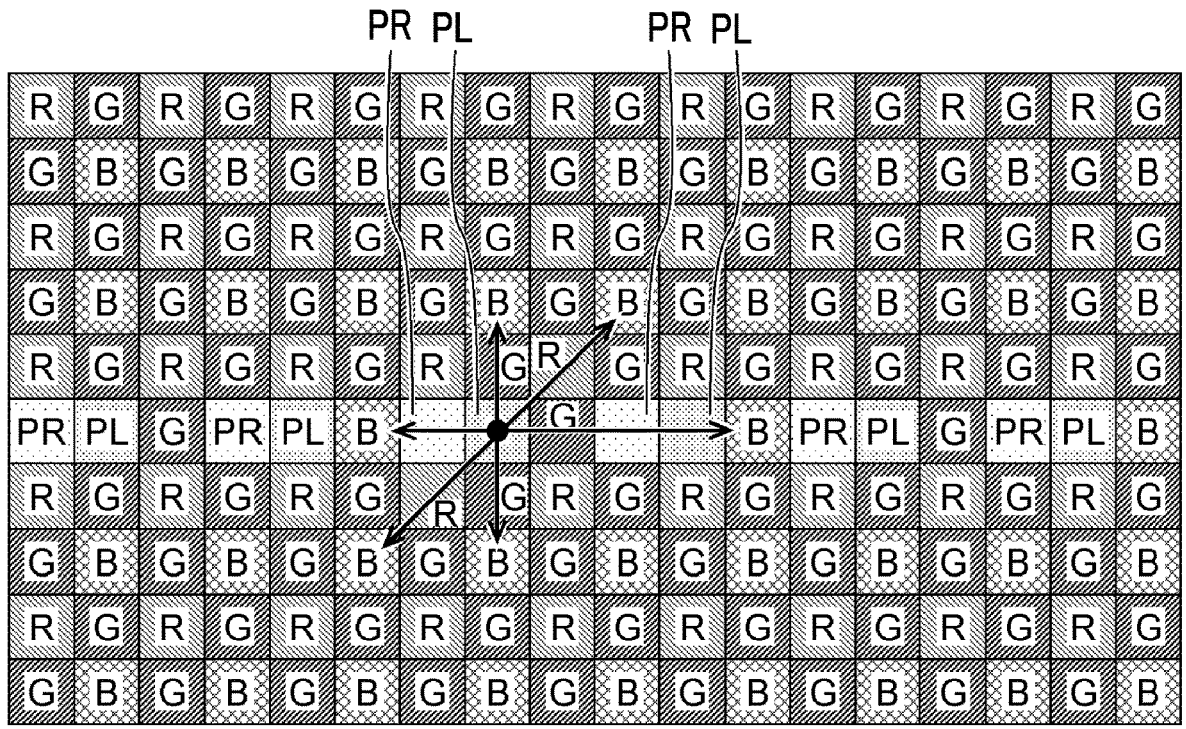
FIG. 19 is another diagram for describing the average value interpolation for the phase difference detection pixels in the imaging element of the second embodiment.

FIG. 19 is another diagram for describing the average value interpolation for the phase difference detection pixel in the imaging element of the second embodiment.

The in-focus pixel which is the interpolation target illustrated in FIG. 19 is the second phase difference pixel PL. The position of the in-focus pixel corresponds to the position of the B pixel.

In a case where the position of the in-focus pixel corresponds to the position of the B pixel, the average value interpolation unit 62 performs the interpolation operation on the pixel value of the in-focus pixel using only the B pixel surrounding the in-focus pixel without using the addition pixel value of the addition pixel added by the pixel value addition unit 64. The reason is that the addition pixel corresponds to the virtual G pixel.

In a case where the signal gradient direction calculated by the signal gradient calculation unit 63 is the horizontal direction, the average value interpolation unit 62 generates the pixel value at the pixel position of the in-focus pixel by interpolating (calculating the weighted average depending on the distance) the pixel value of the B pixel in the horizontal direction (two B pixels illustrated by arrows in the horizontal direction).

In addition, in a case where the signal gradient direction calculated by the signal gradient calculation unit 63 is the vertical direction, the average value interpolation unit 62 generates the pixel value at the pixel position of the in-focus pixel by interpolating the pixel value of the B pixel in the vertical direction (two B pixels illustrated by arrows in the vertical direction).

Similarly, in a case where the signal gradient direction calculated by the signal gradient calculation unit 63 is the +45 degree direction, the average value interpolation unit 62 generates the pixel value at the pixel position of the in-focus pixel by interpolating the B pixel in the +45 degree direction (two B pixels illustrated by arrows in the +45 degree direction). In a case where the signal gradient direction is the −45 degree direction, the average value interpolation unit 62 generates the pixel value at the pixel position of the in-focus pixel by interpolating the B pixel in the −45 degree direction (two B pixels illustrated by arrows in the −45 degree direction).

The aspect of the imaging apparatus to which the present invention can be applied is not limited to the imaging apparatus 10 illustrated in FIG. 1 and is exemplified by, for example, a mobile phone having a camera function, a smartphone, personal digital assistants (PDA), and a portable game console. Hereinafter, one example of the smartphone to which the present invention can be applied will be described.

<Configuration of Smartphone>

Figure 20:
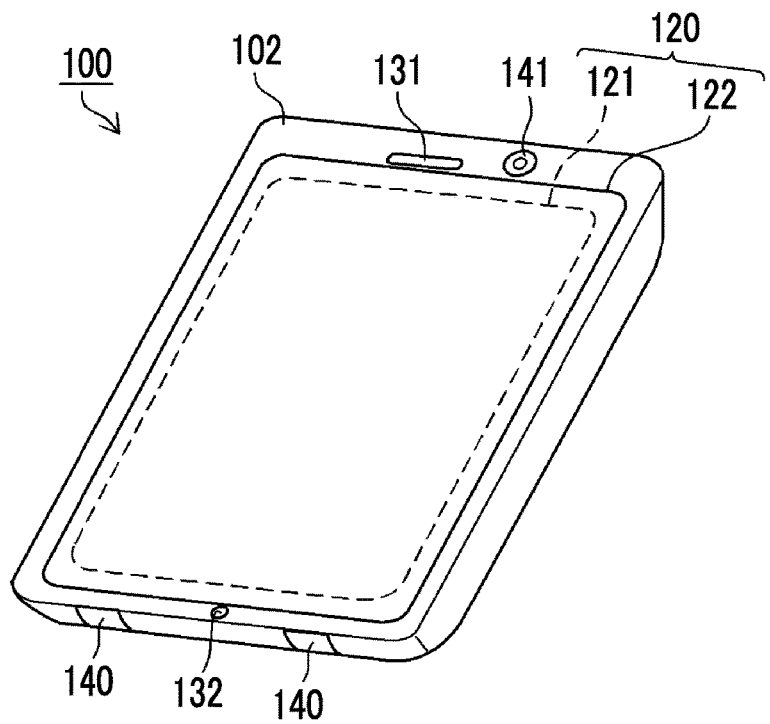
FIG. 20 is a diagram illustrating an exterior of a smartphone as one embodiment of the imaging apparatus.

FIG. 20 is a diagram illustrating an exterior of a smartphone as one embodiment of the imaging apparatus.

A smartphone 100 illustrated in FIG. 20 includes a casing 102 having a flat plate shape. A display and input unit 120 in which a display panel 121 as a display unit and an operation panel 122 as an input unit are formed as a single unit is disposed on one surface of the casing 102. In addition, the casing 102 comprises a speaker 131, a microphone 132, an operation unit 140, and a camera unit 141 (imaging unit). The configuration of the casing 102 is not for limitation purposes. For example, a configuration in which the display unit and the input unit are independently disposed can be employed, or a configuration having a folded structure or a sliding mechanism can be employed.

Figure 21:
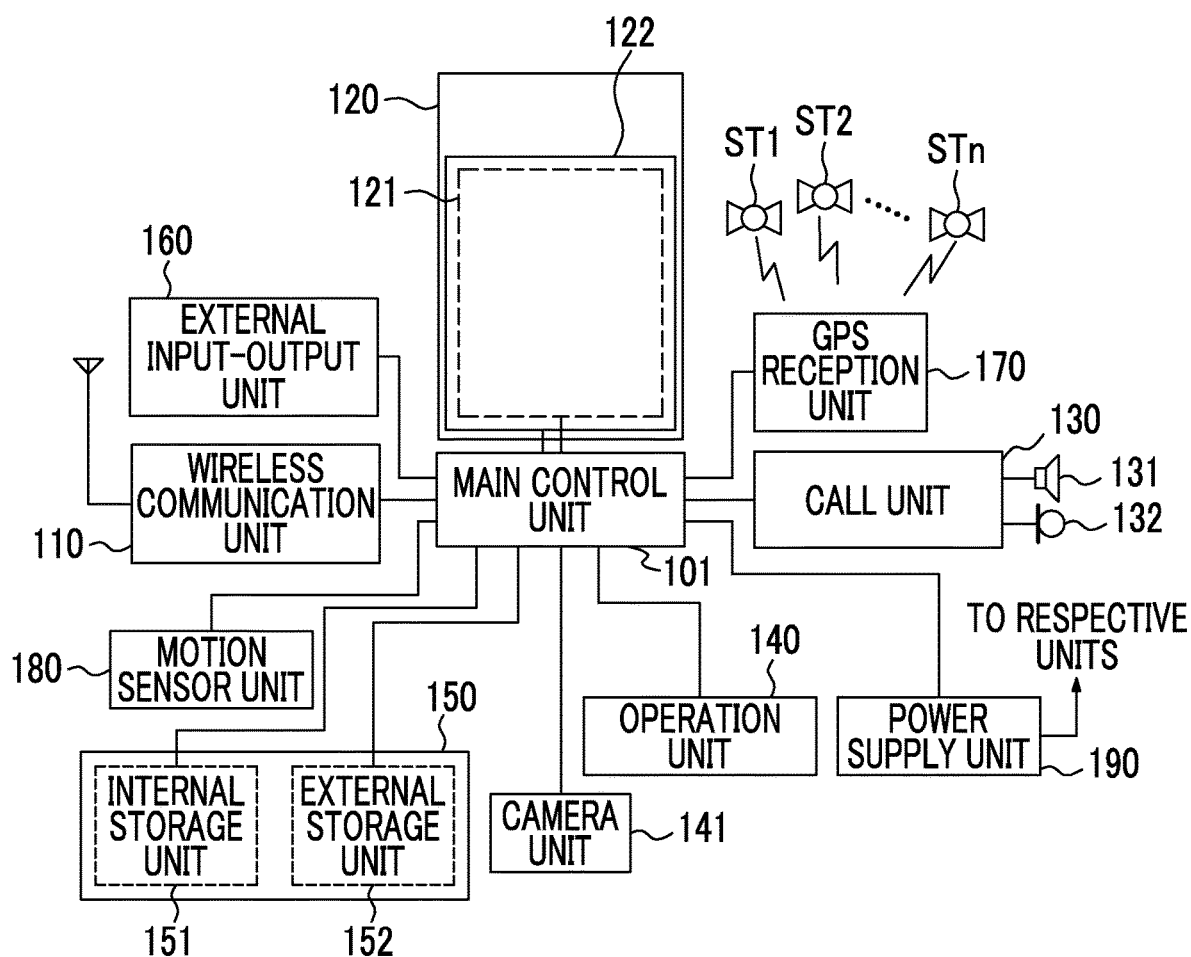
FIG. 21 is a block diagram illustrating an internal configuration of a smartphone 100 illustrated in FIG. 20.

FIG. 21 is a block diagram illustrating an internal configuration of the smartphone 100 illustrated in FIG. 20. As illustrated in FIG. 21, main constituents of the smartphone 100 comprise a wireless communication unit 110, the display and input unit 120, a call unit 130, the operation unit 140, the camera unit 141, a storage unit 150, an external input-output unit 160 (output unit), a global positioning system (GPS) reception unit 170, a motion sensor unit 180, a power supply unit 190, and a main control unit 101. In addition, a main function of the smartphone 100 includes a wireless communication function of performing mobile wireless communication with a base station apparatus through a mobile communication network.

The wireless communication unit 110 performs wireless communication with the base station apparatus connected to the mobile communication network in accordance with an instruction from the main control unit 101. By using the wireless communication, transmission and reception of various file data such as voice data and image data, electronic mail data, and the like and reception of web data, streaming data, and the like are performed.

The display and input unit 120 is a so-called touch panel comprising the operation panel 122 arranged on the screen of the display panel 121. The display and input unit 120 visually delivers information to the user by displaying images (still image and motion image), text information, and the like and detects a user operation performed on the displayed information under control of the main control unit 101. The operation panel 122 is referred to as a touch panel for convenience.

The display panel 121 uses a liquid crystal display (LCD), an organic electro-luminescence display (OELD), or the like as a display device. The operation panel 122 is a device that is disposed in a state where the image displayed on the display surface of the display panel 121 can be visually recognized, and detects one or a plurality of coordinates operated by a finger of the user or a stylus. In a case where the device is operated by the finger of the user or the stylus, the operation panel 122 outputs a detection signal generated by the operation to the main control unit 101. Next, the main control unit 101 detects the operation position (coordinates) on the display panel 121 based on the received detection signal.

The display panel 121 and the operation panel 122 of the smartphone 100 illustrated in FIG. 20 constitute the display and input unit 120 as a single unit. The operation panel 122 is arranged to completely cover the display panel 121. In the case of employing such an arrangement, the operation panel 122 may have a function of detecting the user operation even in a region outside the display panel 121. In other words, the operation panel 122 may comprise a detection region (hereinafter, referred to as a "display region") for an overlapping part in overlap with the display panel 121 and a display region (hereinafter, referred to as a "non-display region") for the other peripheral part not in overlap with the display panel 121.

The size of the display region may completely match the size of the display panel 121. Both sizes do not necessarily match. In addition, the operation panel 122 may comprise two sensitive regions including the peripheral part and the other inner part. Furthermore, the width of the peripheral part is appropriately designed depending on the size and the like of the casing 102. Furthermore, a position detection method employed in the operation panel 122 is exemplified by a matrix switch method, a resistive film method, a surface acoustic wave method, an infrared method, an electromagnetic induction method, an electrostatic capacitive method, and the like. Any method may be employed.

The call unit 130 comprises the speaker 131 and the microphone 132. The call unit 130 converts the voice of the user input through the microphone 132 into voice data processable in the main control unit 101 and outputs the voice data to the main control unit 101, or decodes the voice data received by the wireless communication unit 110 or the external input-output unit 160 and outputs the decoded voice data from the speaker 131. As illustrated in FIG. 20, for example, the speaker 131 and the microphone 132 can be mounted on the same surface as the surface on which the display input unit 120 is disposed.

The operation unit 140 is a hardware key using a key switch or the like and receives an instruction from the user. For example, as illustrated in FIG. 20, the operation unit 140 is a push-button type switch that is mounted on a side surface of the casing 102 of the smartphone 100. In a case where the operation unit 140 is pressed by the finger or the like, the operation unit 140 enters a switch ON state. In a case where the finger is released, the operation unit 140 enters a switch OFF state by a restoring force of a spring or the like.

The storage unit 150 stores a control program and control data of the main control unit 101, address data in which a name, a telephone number, and the like of a communication counterpart are associated, data of transmitted and received electronic mails, web data downloaded by web browsing, downloaded contents data, and the like and also temporarily stores streaming data and the like.

In addition, the storage unit 150 is configured with an internal storage unit 151 incorporated in the smartphone and an external storage unit 152 including a slot for detachable external memory. Each of the internal storage unit 151 and the external storage unit 152 constituting the storage unit 150 is implemented using a storage medium such as a memory of a flash memory type, a hard disk type, a multimedia card micro type, or a card type, a random access memory (RAM), or a read only memory (ROM).

The external input-output unit 160 acts as an interface for all external apparatuses connected to the smartphone 100 and is directly or indirectly connected to other external apparatuses by communication and the like (for example, Universal Serial Bus (USB) and IEEE 1394) or networks (for example, a wireless local area network (LAN), Bluetooth (registered trademark), radio frequency identification (RFID), infrared data association (IrDA), Ultra Wideband (UWB) (registered trademark), and ZigBee (registered trademark)).

For example, the external apparatuses connected to the smartphone 100 include a wired/wireless headset, a wired/wireless external charger, a wired/wireless data port, a memory card or a subscriber identity module (SIM)/user identity module (UIM) card connected through a card socket, an external audio and video apparatus connected through an audio and video input/output (I/O), an external audio and video apparatus connected in a wired/wireless manner, a smartphone, a personal computer, a personal digital assistant (PDA), and an earphone. The external input-output unit 160 may be configured to deliver data transferred from the external apparatuses to each constituent inside the smartphone 100 or transfer data inside the smartphone 100 to the external apparatuses.

The GPS reception unit 170 receives GPS signals transmitted from GPS satellites ST1, ST2 to STn, executes a position measurement calculation process based on the plurality of received GPS signals, and obtains positional information (GPS information) specified by the latitude, the longitude, and the altitude of the smartphone 100 in accordance with an instruction from the main control unit 101. In a case where the positional information can be obtained from the wireless communication unit 110 and/or the external input-output unit 160 (for example, a wireless LAN), the GPS reception unit 170 can detect the position using the positional information.

The motion sensor unit 180 comprises, for example, a three-axis acceleration sensor and detects a physical motion of the smartphone 100 in accordance with an instruction from the main control unit 101. By detecting the physical motion of the smartphone 100, the movement direction and the acceleration of the smartphone 100 are detected. The result of the detection is output to the main control unit 101.

The power supply unit 190 supplies power stored in a battery (not illustrated) to each unit of the smartphone 100 in accordance with an instruction from the main control unit 101.

The main control unit 101 comprises a microprocessor, operates in accordance with the control program and the control data stored in the storage unit 150, and manages and controls each unit of the smartphone 100. In addition, the main control unit 101 comprises a mobile communication control function of controlling each unit of a communication system and an application processing function in order to perform voice communication and data communication through the wireless communication unit 110.

The application processing function is implemented by operating the main control unit 101 in accordance with application software stored in the storage unit 150. For example, the application processing function includes an infrared communication function of performing data communication with an opposing apparatus by controlling the external input-output unit 160, an electronic mail function of transmitting and receiving electronic mails, and a web browsing function of browsing web pages, and also includes an image processing function according to the embodiment of the present invention.

In addition, the main control unit 101 has the image processing function such as displaying a video on the display and input unit 120 based on image data (data of a still image or a motion image) such as reception data and downloaded streaming data. In addition, the image processing function includes image processing performed by the image processing unit 24 illustrated in FIG. 3.

Furthermore, the main control unit 101 executes display control of the display panel 121 and operation detection control for detecting the user operation performed through the operation unit 140 or the operation panel 122.

By executing the display control, the main control unit 101 displays an icon for starting the application software or a software key such as a scroll bar, or displays a window for composing an electronic mail. The scroll bar refers to a software key for receiving an instruction to move a display part of an image for a large image or the like not accommodated in the display region of the display panel 121.

In addition, by executing the operation detection control, the main control unit 101 detects the user operation performed through the operation unit 140, receives an operation performed on the icon through the operation panel 122 or an input of a text string in an input field of the window, or receives a request for scrolling the display image through the scroll bar.

Furthermore, by executing the operation detection control, the main control unit 101 comprises a touch panel control function of determining whether the operation position on the operation panel 122 corresponds to the overlapping part (display region) in overlap with the display panel 121 or the other peripheral part (non-display region) not in overlap with the display panel 121 and controlling the sensitive region of the operation panel 122 and the display position of the software key.

In addition, the main control unit 101 can detect a gesture operation performed on the operation panel 122 and execute a present function depending on the detected gesture operation. The gesture operation is not a simple touch operation in the related art and means an operation of drawing a trajectory by the finger or the like, specifying a plurality of positions at the same time, or an operation of a combination thereof by drawing a trajectory from at least one of the plurality of positions.

The camera unit 141 converts the image data obtained by imaging into compressed image data in, for example, joint photographic experts group (JPEG) and records the image data in the storage unit 150 or outputs the image data through the external input-output unit 160 or the wireless communication unit 110 under control of the main control unit 101. As illustrated in FIG. 20, in the smartphone 100, the camera unit 141 is mounted on the same surface as the display and input unit 120. However, the mounting position of the camera unit 141 is not for limitation purposes, and the camera unit 141 may not be mounted on the side surface of the casing 102 on which the display and input unit 120 is disposed. The camera unit 141 may be mounted on the rear surface of the casing 102, or a plurality of camera units 141 may be mounted on the casing 102. In a case where the plurality of camera units 141 are mounted, imaging may be performed by a single camera unit 141 by switching the camera unit 141 performing the imaging, or imaging may be performed using the plurality of camera units 141 at the same time.

In addition, the camera unit 141 can be used in various functions of the smartphone 100. For example, the image obtained by the camera unit 141 may be displayed on the display panel 121, or the image captured and obtained in the camera unit 141 may be used as one of operation input methods for the operation panel 122. In addition, in the detection of the position by the GPS reception unit 170, the position may be detected with reference to the image from the camera unit 141. Furthermore, with reference to the image from the camera unit 141, a determination of the optical axis direction of the camera unit 141 of the smartphone 100 and a determination of the current usage environment can be performed without using the three-axis acceleration sensor or along with the three-axis acceleration sensor. The image from the camera unit 141 can also be used in the application software.

Besides, data obtained by adding the positional information obtained by the GPS reception unit 170, voice information (may be text information obtained by performing voice-to-text conversion by the main control unit or the like) obtained by the microphone 132, attitude information obtained by the motion sensor unit 180, and the like to the image data of the still picture or the motion picture can be recorded in the storage unit 150 or output through the external input-output unit 160 or the wireless communication unit 110.

[Others]

In the imaging element of the present embodiment, while the G filter is arranged in the phase difference detection pixel, the phase difference detection pixel may be configured such that light in a wider wavelength range than the transmission wavelength range of the G filter can be incident on the phase difference detection pixel. For example, a transparent filter can be used without disposing the G filter in the phase difference detection pixel. Accordingly, a high pixel value can be obtained from even the phase difference detection pixel having a smaller opening portion than the normal pixel (the phase difference detection pixel can have high sensitivity).

In addition, while the phase difference pixel row in each of the first embodiment of the imaging element illustrated in FIG. 4 and the second embodiment of the imaging element illustrated in FIG. 17 is configured by periodically arranging three pixels including the pair of the first phase difference pixel PR and the second phase difference pixel PL and one normal pixel as one cycle, the phase difference pixel row is not for limitation purposes. For example, in the case of the first embodiment of the imaging element illustrated in FIG. 4, the phase difference pixel row may be configured by periodically arranging six pixels including the pair of the first phase difference pixel PR and the second phase difference pixel PL and four normal pixels as one cycle. In addition, in the case of the second embodiment of the imaging element illustrated in FIG. 17, the phase difference pixel row may be configured by periodically arranging five pixels including the pair of the first phase difference pixel PR and the second phase difference pixel PL and three normal pixels as one cycle or periodically arranging the first filter, the plurality of second filters respectively corresponding to two or more colors other than the first color, and six pixels including the pair of the first phase difference pixel PR and the second phase difference pixel PL and four normal pixels as one cycle.

Furthermore, the color filter arrangement is not limited to the X-Trans arrangement illustrated in FIG. 4 and the Bayer arrangement illustrated in FIG. 17. The color filter arrangement may be any periodic arrangement of the first filter corresponding to the first color most contributing to obtaining the brightness signal and the plurality of second filters respectively corresponding to two or more colors other than the first color.

In addition, in the present embodiment, for example, the hardware structures of processing units executing various processes like the image processing unit 24 and the interpolation processing unit 60 correspond to various processors as illustrated below. Various processors include a central processing unit (CPU) that is a general-purpose processor functioning as various processing units by executing software (program), a programmable logic device (PLD) such as a field programmable gate array (FPGA) that is a processor capable of changing a circuit configuration after manufacturing, a dedicated electric circuit such as an application specific integrated circuit (ASIC) that is a processor having a circuit configuration dedicatedly designed to execute a specific process, and the like.

One processing unit may be configured with one of the various processors or may be configured with two or more processors (for example, a plurality of FPGAs or a combination of a CPU and an FPGA) of the same type or different types. In addition, a plurality of processing units may be configured with one processor. A first example of configuring a plurality of processing units with one processor is such that one processor is configured with a combination of one or more CPUs and software, and the processor functions as a plurality of processing units. A second example is such that a processor that implements the function of the whole system including the plurality of processing units using one integrated circuit (IC) is used, as represented by a system on chip (SoC) or the like. Various processing units are configured using one or more of the various processors as a hardware structure. Furthermore, the hardware structure of the various processors is more specifically an electric circuit (circuitry) in which circuit elements such as semiconductor elements are combined.

In addition, the present invention is not limited to the above embodiments, and various modifications can be made without departing from the spirit of the present invention.

EXPLANATION OF REFERENCES

1: strobe
2: shutter button

3: power supply/mode switch
4: mode dial
5: zoom button
5T: tele button
5W: wide button
6: cross button
7: MENU/OK button
8: playback button
9: BACK button
10: imaging apparatus
12: imaging lens
14: stop
15: mechanical shutter
16: imaging element
16A, 16B: light shielding film
22: image input controller
24: image processing unit
26: compression/expansion processing unit
28: video encoder
30: liquid crystal monitor
32: sensor drive unit
33: shutter drive unit
34: stop drive unit
36: lens drive unit
38: operation unit
40: CPU
42: phase difference detection unit
44: AE detection unit
47: ROM
48: memory
50: VRAM
52: media controller
54: memory card
60: interpolation processing unit
61: gain interpolation unit
62: average value interpolation unit
63: signal gradient calculation unit
64: pixel value addition unit
65: final pixel value decision unit
66: addition pixel level correction unit
67: saturation determination unit
68: flatness determination unit
100: smartphone
101: main control unit
102: casing
110: wireless communication unit
120: display and input unit
121: display panel
122: operation panel
130: call unit
131: speaker
132: microphone
140: operation unit
141: camera unit
150: storage unit
151: internal storage unit
152: external storage unit
160: external input-output unit
170: GPS reception unit
180: motion sensor unit
190: power supply unit
CF: color filter
L: microlens
P: basic arrangement pattern
PD: photodiode
PR: first phase difference pixel
PL: second phase difference pixel

What is claimed is:

1. An imaging apparatus comprising:
an imager in which a plurality of phase difference detection pixels and a plurality of normal pixels are two-dimensionally arranged in a first direction and a second direction orthogonal to the first direction, the phase difference detection pixels include a first phase difference pixel and a second phase difference pixel including opening portions for pupil separation at different positions in the first direction, and the opening portions of the first phase difference pixel and the second phase difference pixel are adjacently arranged; and
processing circuitry configured to:
generate an addition pixel value at a pixel position between the first phase difference pixel and the second phase difference pixel by adding pixel values of the first phase difference pixel and the second phase difference pixel; and
set the first phase difference pixel or the second phase difference pixel as an in-focus pixel and generate a pixel value at a pixel position of the in-focus pixel by using pixel values of pixels surrounding the pixel position of the in-focus pixel, the addition pixel value that has been added being used as a pixel value of one pixel of the surrounding pixels.

2. The imaging apparatus according to claim 1, wherein:
the processing circuitry is further configured to correct the addition pixel value by multiplying the addition pixel value that has been added by a set level adjustment coefficient; and
the processing circuitry uses the addition pixel value that has been corrected.

3. The imaging apparatus according to claim 1, wherein:
the processing circuitry is further configured to calculate signal gradients of the pixels surrounding the pixel position of the in-focus pixel; and
the processing circuitry performs an interpolation operation on the pixel value at the pixel position of the in-focus pixel using a pixel value of a pixel selected based on the calculated signal gradients out of the surrounding pixels.

4. The imaging apparatus according to claim 1, wherein:
the processing circuitry is further configured to set the first phase difference pixel or the second phase difference pixel as the in-focus pixel and generate the pixel value at the pixel position of the in-focus pixel by gain interpolation; and
the processing circuitry generates the pixel value at the pixel position of the in-focus pixel by the gain interpolation based on the pixel value of the in-focus pixel and gain interpolation information set for the pixel position of the in-focus pixel.

5. The imaging apparatus according to claim 4, wherein the processing circuitry is further configured to decide a final pixel value at the pixel position of the in-focus pixel by selecting any one pixel value of two pixel values including the pixel value that has been generated at the pixel position of the in-focus pixel and the pixel value that has been generated at the pixel position of the in-focus pixel or generating a pixel value obtained by weighted addition of the two pixel values.

6. The imaging apparatus according to claim 1, further comprising an imaging optical system that forms a subject image on a light-receiving surface of the imager,
wherein the processing circuitry is further configured to detect a phase difference between a first pixel value obtained from the first phase difference pixel of the imager and a second pixel value obtained from the second phase difference pixel; and control the imaging optical system based on the phase difference that has been detected.

7. The imaging apparatus according to claim 1, wherein in the plurality of normal pixels, a first filter corresponding to a first color most contributing to obtaining a brightness signal and a plurality of second filters respectively corresponding to two or more colors other than the first color are arranged in a first periodic color arrangement.

8. The imaging apparatus according to claim 7, wherein the processing circuitry uses at least one pixel value of the addition pixel value or a pixel value of the normal pixel in which the first filter is arranged.

9. The imaging apparatus according to claim 7, wherein in a case where the pixel position of the in-focus pixel corresponds to a pixel position of the normal pixel in which the second filter is arranged, the processing circuitry uses only the normal pixel in which the second filter is arranged.

10. The imaging apparatus according to claim 7, wherein in each of the first phase difference pixel and the second phase difference pixel, the first filter is arranged, or light in a wavelength range wider than a transmission wavelength range of the first filter is incident.

11. The imaging apparatus according to claim 10, wherein:
the processing circuitry is further configured to determine saturation of at least one pixel of the in-focus pixel, the first phase difference pixel or the second phase difference pixel adjacent to the in-focus pixel, or the normal pixel which is adjacent to the in-focus pixel and in which the first filter is arranged; and
in a case where the processing circuitry determines that the pixel is saturated, the processing circuitry uses only the pixel value of the normal pixel in which the first filter is arranged.

12. The imaging apparatus according to claim 10, wherein:
the first filter is a green filter allowing transmission in a wavelength range of green, and the plurality of second filters include a red filter allowing transmission in a wavelength range of red and a blue filter allowing transmission in a wavelength range of blue;
the first periodic color arrangement arranged in the two-dimensionally arranged plurality of phase difference detection pixels and the plurality of normal pixels is configured by alternately arranging, in the first direction and the second direction, a first arrangement that corresponds to 3×3 pixels and in which the green filters are arranged at a center and four corners, the red filters are arranged in the first direction on both sides of the green filter at the center, and the blue filters are arranged in the second direction, and a second arrangement that corresponds to 3×3 pixels and in which the green filters are arranged at a center and four corners, the blue filters are arranged in the first direction on both sides of the green filter at the center, and the red filters are arranged in the second direction; and
the imager includes a phase difference pixel row in which the first phase difference pixel and the second phase difference pixel are arranged at positions adjacent to the green filter in the first direction, and a normal pixel row in which only the normal pixel is arranged in the first direction.

13. The imaging apparatus according to claim 10, wherein:
the first periodic color arrangement arranged in the plurality of normal pixels is a Bayer arrangement;
the imager includes a phase difference pixel row in which the first phase difference pixel, the second phase difference pixel, and the normal pixel are arranged in the first direction, and a normal pixel row in which only the normal pixel is arranged in the first direction; and
in the phase difference pixel row, three pixels including the first and second phase difference pixels and one normal pixel as one cycle are periodically arranged, and a green filter allowing transmission in a wavelength range of green is arranged in the first phase difference pixel and the second phase difference pixel.

14. An image processing method for an imaging apparatus comprising an imager in which a plurality of phase difference detection pixels and a plurality of normal pixels are two-dimensionally arranged in a first direction and a second direction orthogonal to the first direction, the phase difference detection pixels include a first phase difference pixel and a second phase difference pixel including opening portions for pupil separation at different positions in the first direction, and the opening portions of the first phase difference pixel and the second phase difference pixel are adjacently arranged, the method comprising:
generating an addition pixel value at a pixel position between the first phase difference pixel and the second phase difference pixel by adding pixel values of the first phase difference pixel and the second phase difference pixel;
selecting the first phase difference pixel or the second phase difference pixel that is not processed as an in-focus pixel; and
generating a pixel value at a pixel position of the selected in-focus pixel by using pixel values of pixels surrounding the pixel position of the in-focus pixel, the addition pixel value being used as a pixel value of one pixel of the surrounding pixels.

15. The image processing method according to claim 14, further comprising correcting the addition pixel value by multiplying the addition pixel value by a set level adjustment coefficient,
wherein the addition pixel value corrected using the level adjustment coefficient is used when the pixel value at the pixel position of the selected in-focus pixel is generated.

16. The image processing method according to claim 14, wherein:
in the plurality of normal pixels, a first filter corresponding to a first color most contributing to obtaining a brightness signal and a plurality of second filters respectively corresponding to two or more colors other than the first color are arranged in a first periodic color arrangement; and
at least one pixel value of the addition pixel value or a pixel value of the normal pixel in which the first filter is arranged is used when the pixel value at the pixel position of the selected in-focus pixel is generated.

17. The image processing method according to claim 14, further comprising
calculating signal gradients of the pixels surrounding the pixel position of the in-focus pixel,
wherein an interpolation operation is performed on the pixel value at the pixel position of the in-focus pixel using a pixel value of a pixel selected based on the calculated signal gradients out of the surrounding pixels when the pixel value at the pixel position of the selected in-focus pixel is generated.

\* \* \* \* \*